(12) United States Patent
Kim

(10) Patent No.: US 11,941,820 B1
(45) Date of Patent: Mar. 26, 2024

(54) METHOD FOR TRACKING AN OBJECT IN A LOW FRAME-RATE VIDEO AND OBJECT TRACKING DEVICE USING THE SAME

(71) Applicant: Superb AI Co., Ltd., Seoul (KR)

(72) Inventor: Kye Hyeon Kim, Suwon-si (KR)

(73) Assignee: Superb AI Co., Ltd., Seoul (KR)

( * ) Notice: Subject to any disclaimer, the term of this patent is extended or adjusted under 35 U.S.C. 154(b) by 0 days.

(21) Appl. No.: 18/384,706

(22) Filed: Oct. 27, 2023

(30) Foreign Application Priority Data

Nov. 22, 2022 (KR) .......................... 1020220157632

(51) Int. Cl.
*G06T 7/246* (2017.01)
*G06T 7/11* (2017.01)
*G06T 7/73* (2017.01)

(52) U.S. Cl.
CPC ............... *G06T 7/246* (2017.01); *G06T 7/11* (2017.01); *G06T 7/73* (2017.01); *G06T 2207/10016* (2013.01); *G06T 2207/20016* (2013.01); *G06T 2207/20081* (2013.01); *G06T 2207/20084* (2013.01); *G06T 2207/20132* (2013.01)

(58) Field of Classification Search
CPC ... G06T 7/11; G06T 7/174; G06T 7/20; G06T 7/207; G06T 7/223; G06T 7/246; G06T 7/97; G06T 2207/20016; G06T 2207/20081; G06T 2207/20084; G06V 10/25; G06V 10/62; G06V 10/77; G06V 10/7715; G06V 10/82; G06V 20/46; G06N 3/04; G06N 3/0464; G06N 3/047
See application file for complete search history.

(56) References Cited

U.S. PATENT DOCUMENTS

2020/0372265 A1* 11/2020 Ko et al. .............. G06V 20/588
2021/0383166 A1* 12/2021 Nie ..................... G06F 18/2137

* cited by examiner

*Primary Examiner* — Andrew W Johns
(74) *Attorney, Agent, or Firm* — Frost Brown Todd LLP; Alexander J. Johnson

(57) ABSTRACT

A method for tracking an object in a low frame rate video is provided. Matching processes are performed between consecutive frames by using conversion feature maps acquired by converting each of features on feature maps of the consecutive frames into feature descriptors including each corresponding feature information and each corresponding location information, thereby allowing object tracking regardless of whether time interval per frame is long or short. The object tracking is performed by matching feature descriptors on a plurality of pyramid feature maps on an entire area of a next frame and feature descriptors on a plurality of cropped feature maps generated by cropping object areas extracted on a current frame, thereby allowing not only quick matching between the cropped areas and the entire area but also the increased accuracy due to no limitation of the feature searching area.

16 Claims, 9 Drawing Sheets

FIG. 3
(PRIOR ART)
T = 0            T = 1
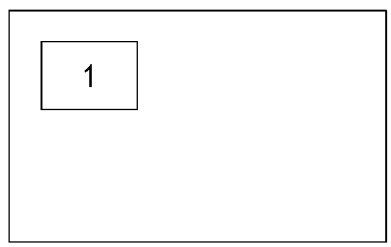 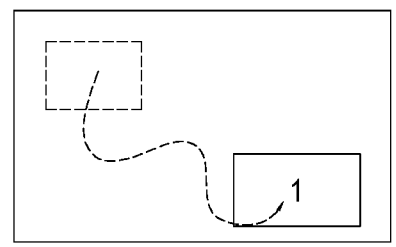

METHOD FOR TRACKING AN OBJECT IN A LOW FRAME-RATE VIDEO AND OBJECT TRACKING DEVICE USING THE SAME

CROSS REFERENCE OF RELATED APPLICATION

This present application claims the benefit of the earlier filing date of Korean patent application No. 10-2022-0157632, filed on Nov. 22, 2022, the entire contents of which being incorporated herein by reference.

FIELD OF THE DISCLOSURE

The present disclosure relates to a method for tracking at least one object in a low frame-rate video and an object tracking device using the same; and more particularly, to the method for (i) acquiring a plurality of cropped feature maps for object regions extracted from a current frame in order to track objects in consecutive frames and a plurality of pyramid feature maps for an entire region of a next frame, (ii) generating conversion feature maps acquired by converting each of features of the cropped feature maps and the pyramid feature maps into feature descriptors including each corresponding feature information and each corresponding location information, and (iii) tracking the objects, matched with the objects in the current frame, in the next frame by using matching relationships among the conversion feature maps having matched scale, and the object tracking device using the same.

BACKGROUND OF THE DISCLOSURE

Object tracking refers to a technology of tracking movement of objects detected in images, and can be used in tracking the movement of the objects such as vehicles, humans, animals and the like contained in the images. Accordingly, processes of detecting target objects for each frame, i.e., each image, and imparting each of identical unique IDs to each of the target objects for each frames are performed.

Examples of conventional technologies of performing such object tracking are as follows.

Firstly, according to a conventional technology using a Motion Model like FIG. 1, each of unique IDs is imparted for each of objects (i.e., each object included in each area marked with 1, 2, 3) detected in a frame of a current time t (herein, t=0), and initialization, e.g., dx=dy=d, log w=d and log h=0, of the Motion model for each of the objects is performed. Herein, Kalman Filter may be used for the Motion Model. Then, while each of locations of each of the objects is predicted by using the Motion Model in a frame of a next time t+1 (herein,t=1) (there would be no movement of the objects predicted in the next frame since the Motion Model is initialized in the previous frame), object detection is also performed as thick boxes for the frame of t+1 as shown in the second upper figure of t=1. After matching the first upper figure of t=1 with the second upper figure of t=1 as shown in the third upper figure of t=1, each of locations of each of the objects is updated as shown in the fourth upper figure of t=1.

Then, the process of performing in the frame of t=1 is repeated in each consecutive frame (example: t=2, 3, 4, . . . ). For example, each of motion models for each of the objects is updated as shown in the fourth upper figure of t=2 based on each of differences between matched areas (by using Hungarian Algorithm), i.e., between each of box areas corresponding to each of the objects moved by predicting the movement thereof through the Motion Model as shown in the first upper figure of t=2 and each of box areas of each of the objects detected through an object detection technology as shown in the second upper figure of t=2. Herein, the dotted lines in the first upper figure of t=2 represent the locations of the objects at t=1.

As another conventional technology, in case of object tracking using density estimation like FIG. 2, firstly, each of unique IDs is imparted for each of objects (i.e., each object included in each area marked with 1, 2, 3) detected in a frame of a current time t (herein, t=0), and each of features of each of box areas corresponding to each of the objects is extracted. Then, while a process of detecting each of box areas (i.e., as shown in dotted boxes of t=1) where each of features is most similarly extracted in its surrounding area of each of the objects having its corresponding unique ID is repetitively performed in a frame of a next time t+1 (herein, t=1), object detection is also performed as thick boxes for the frame of t+1 as shown in the second upper figure of t=1. Herein, as a technology of the density estimation for detecting the dotted boxes, an algorithm such as Mean Shift Tracking Algorithm may be used. Accordingly, each of the features is extracted as shown in the fourth upper figure of t=1 for each of the box areas adjusted by matching (as shown in the third upper figure of t=1 by using Hungarian Algorithm) each of the box areas corresponding to each of the objects moved based on the dotted boxes as shown in the first upper figure of t=1 and each of the box areas of each of the objects extracted through an object detection technology as shown in the second upper figure of t=1, and then the process of performing in the frame of t=1 is repeated in each consecutive frame (example: t=2, 3, 4, . . . ).

However, such conventional technologies have limits in accurately tracking objects in an image, i.e., a video, having low frame-rate (or low frames per second). Herein, in case of a general video, generally 30 to 60 frames are taken per second, and accordingly a time interval per frame is about 1/30 to 1/60, whereas a video in a low frame-rate, i.e., one frame per second, means a case where the number of the frame taken per second is remarkably lower than the general video. In case the frame rate is remarkably reduced like this, considerable difference may occur in a movement of an object or a change in a shape of the object as exemplarily shown in FIG. 3 between consecutive frames compared to the general video.

Accordingly, in case of performing the object tracking using the motion model in a video of such a low-frame rate, the time interval per frame is too long, and thus there is a difficulty in accurately predicting the motion change between the consecutive frames. In addition, in case of applying the object tracking using the density estimation to a video of low-frame rate, since area to be searched for detecting similar features should be considerably increased the searching time is also increased, and if the shape of the object changes considerably during the long time interval between the consecutive frames, a case of failing in extracting the similar features or a case of selecting an inaccurate area for the similar features may occur.

In order to solve such problems, there may be a method such as Random Sample Consensus (RANSAC) Algorithm of extracting local features from each of two consecutive frames, generating matching pairs for the local features between the consecutive frames, thereby extracting an ideal model in which the number of the matching pairs is the most, selecting specific local features which are matched between the consecutive frames, and predicting the movement of objects between the consecutive frames, but there is a problem of limitation in estimating the objects by using such a method in case of frames with little context to be used for extracting important features.

Therefore, an enhanced method for solving the aforementioned problems is required.

SUMMARY OF THE DISCLOSURE

It is an object of the present disclosure to solve all the aforementioned problems.

It is another object of the present disclosure to perform matching between consecutive frames by using conversion feature maps acquired by converting each of features on feature maps of the consecutive frames into feature descriptors including each corresponding feature information and each corresponding location information, thereby allowing object tracking regardless of whether time interval per frame is long or short.

It is still another object of the present disclosure to perform the object tracking by matching feature descriptors on a plurality of pyramid feature maps on an entire area of a next frame and feature descriptors on a plurality of cropped feature maps generated by cropping object areas extracted on a current frame, thereby allowing not only quick matching between the cropped areas and the entire area but also the increased accuracy due to no limitation of the feature searching area.

It is still yet another object of the present disclosure to determine numerous matched feature descriptors in each of object areas of the current frame and the next frame and thus allow at least part of the feature descriptors to be matched even if the shape, e.g., a pose, an angle, etc., of the objects considerably changes during the long time interval between the consecutive frames in a low-frame video, thereby allowing accurate and stable object tracking.

In accordance with one aspect of the present disclosure, there is provided a method for tracking an object in a low frame rate video, including steps of: (a) in response to acquiring a video image including a plurality of frames from an imaging device, an object tracking device (i) inputting a t-th frame corresponding to a current time among the plurality of frames into an object detection network, thereby instructing the object detection network to input the t-th frame into FPN (Feature Pyramid Network) and thus generate each of a (1_1)-st pyramid feature map to a (1_k)-th pyramid feature map corresponding to each of a 1-st scale to a k-th scale, wherein the k is an integer of two or more, and (ii) performing an object detection on a 1-st combined feature map, in which the (1_1)-st pyramid feature map to the (1_k)-th pyramid feature map are combined, and thus detect 1-st objects contained in a 1-st frame, thereby acquiring 1-st bounding boxes corresponding to the 1-st objects, and imparting unique IDs to the 1-st objects; and (b) the object tracking device (i) (i-1) inputting a (t+1)-th frame which is a next frame of the t-th frame into the object detection network, thereby instructing the object detection network to input the (t+1)-th frame into the FPN and thus generate each of a (2_1)-st pyramid feature map to a (2_k)-th pyramid feature map corresponding to the 1-st scale to the k-th scale and (i-2) performing an object detection on a 2-nd combined feature map, in which the (2_1)-st pyramid feature map to the (2_k)-th pyramid feature map are combined, and thus detect 2-nd objects contained in the (t+1)-th frame, thereby acquiring 2-nd bounding boxes corresponding to the 2-nd objects, (ii) (ii-1) generating a (1_1)-st cropped feature map acquired by cropping regions corresponding to the 1-st bounding boxes from a (1_1)-st specific pyramid feature map corresponding to a 1-st specific scale among the (1_1)-st pyramid feature map to the (1_k)-st pyramid feature map, (ii-2) inputting the (1_1)-st cropped feature map and a (2_1)-st specific pyramid feature map respectively into a 1-st self-attention layer and a 1-st cross attention layer, wherein the (2_1)-st specific pyramid feature map corresponds to the 1-st specific scale among the (2_1)-st pyramid feature map to the (2_k)-th pyramid feature map, thereby instructing the 1-st self-attention layer and the 1-st cross attention layer to respectively perform operations related to self-attention and operations related to cross-attention on the (1_1)-st cropped feature map and the (2_1)-st specific pyramid feature map and thus generate a (1_1)-st conversion feature map and a (2_1)-st conversion feature map, wherein the (1_1)-st conversion feature map is acquired by converting each of 1-st features of the 1-st cropped feature map to 1-st feature descriptors containing feature information and location information of each of the 1-st features and wherein the (2_1)-st conversion feature map is acquired by converting each of 2-nd features of the (2_1)-st specific pyramid feature map to 2-nd feature descriptors containing feature information and location information of each of the 2-nd features, and (ii-3) inputting the (1_1)-st conversion feature map and the (2_1)-st conversion feature map into a matching layer, thereby instructing the matching layer to acquire 1-st matching pairs by using 1-st matching probabilities acquired by matching the 1-st feature descriptors on the (1_1)-st conversion feature map and the 2-nd feature descriptors on the (2_1)-st conversion feature map, and (iii) selecting a specific 2-nd bounding box containing specific 2-nd features the most corresponding to specific 2-nd feature descriptors according to the 1-st matching pairs among the 2-nd bounding boxes, and imparting a specific unique ID identical to that of a specific 1-st object to a specific 2-nd object, wherein the specific 1-st object corresponds to a specific 1-st bounding box and the specific 2-nd object corresponds to the specific 2-nd bounding box, thereby performing object tracking.

As one example, at the step of (b), on condition that the 1-st matching pairs have been acquired, the object tracking device (i) (i-1) generates (1_2)-st cropped feature map acquired by cropping regions corresponding to the 1-st bounding boxes in a (1_2)-nd specific pyramid feature map corresponding to a 2-nd specific scale among the (1_1)-st pyramid feature map to the (1_k)-th pyramid feature map, wherein the 2-nd specific scale is a greater scale than the 1-st specific scale, (i-2) selects a (2_2)-nd specific pyramid feature map corresponding to the 2-nd specific scale among the (2_1)-st pyramid feature map to the (2_k)-th pyramid feature map, (i-3) converts specific 1-st feature descriptors and the specific 2-nd feature descriptors corresponding to the 1-st matching pairs respectively to 1-st feature descriptors of the (1_2)-nd cropped feature map and 2-nd feature descriptors on the (2_2)-nd specific pyramid feature map, (i-4) inputs 1-st windows cropped to include each of the 1-st feature descriptors of the (1_2)-nd cropped feature map and 2-nd windows cropped to include each of the 2-nd feature descriptors on the (2_2)-nd specific pyramid feature map into a 2-nd self-attention layer and a 2-nd cross-attention layer, thereby instructing the 2-nd self-attention layer and the 2-nd cross attention layer to respectively perform operations related to self-attention and operations related to cross-attention on the 1-st windows and the 2-nd windows and thus generate (1_2)-nd conversion feature maps centering each of the 1-st feature descriptors on the (1_2)-nd cropped feature map and (2_2)-nd conversion feature maps centering each of the 2-nd feature descriptors on the (2_2)-nd specific pyramid feature map, and (i–5) generate specific 1-st feature descriptors on the (1_2)-nd cropped feature map corresponding to central vectors of the (1_2)-nd conversion feature maps and specific 2-nd feature descriptors on the (2_2)-nd specific pyramid feature map corresponding to specific vectors of the (2_2)-nd conversion feature maps matching with the specific 1-st feature descriptors, thereby generating 2-nd matching pairs, by using heatmaps indicating 2-nd matching probabilities generated by correlating the central vectors of the (1_2)-nd conversion feature maps with all vectors of the (2_2)-nd conversion feature maps corresponding to each of the (1_2)-nd conversion feature maps and performing softmax operation thereon, and (ii) selects a specific 2-nd bounding box containing specific 2-nd features the most corresponding to the specific 2-nd feature descriptors according to the 2-nd matching pairs among the 2-nd bounding boxes, thereby imparting the specific unique ID identical to that of the specific 1-st object corresponding to the specific 1-st bounding box to the specific 2-nd object corresponding to the specific 2-nd bounding box and thus performing the object tracking.

As one example, prior to the step of (a), the object tracking device (i) performs the object detection and the object tracking for t-th frame for training and (t+1)-th frame for training, thereby acquiring 1-st matching pairs for training and 2-nd matching pairs for training, (ii) trains at least part of weights of the 1-st self-attention layer, weights of the 1-st cross-attention layer and weights of the matching layer as learning processes for the 1-st matching pairs for training by using negative log-likelihood loss for 1-st matching probabilities for training, and (iii) trains at least part of weights of the 2-nd self-attention layer and weights of the 2-nd cross-attention layer as learning processes for the 2-nd matching pairs for training by using ground truth descriptors corresponding to feature descriptors for training of specific vectors for training of (2_2)-nd conversion feature map for training and total variance of heatmap for training with respect to 2-nd matching probabilities for training.

As one example, at the step of (b), the object tracking device (i) adds (1) leveled feature maps acquired by converting each of the (1_1)-st cropped feature map and the (2_1)-st specific pyramid feature map into each one-dimension vector, and (2) a position conversion map acquired by changing (x, y) coordinates which are positional information of features of the (1_1)-st cropped feature map and the (2_1)-st specific pyramid feature map into Random Fourier Features each of which is each sum of a cosine function and a sine function, and performs operations related to self-attention on a summation of said (1) and said (2), to thereby generate a 1-st self-attention result and a 2-nd self-attention result respectively corresponding to the (1_1)-st cropped feature map and the (2_1)-st specific pyramid feature map, and (ii) generates the (1_1)-st conversion feature map and the (2_1)-st conversion feature map by performing operations related to cross-attention on the 1-st self-attention result and the 2-nd self-attention result.

As one example, at the step of (b), the object tracking device (i) crops the areas corresponding to the 1-st bounding boxes on the (1_1)-st specific pyramid feature map corresponding to a 1-st specific scale among the (1_1)-st pyramid feature map to the (1_k)-st pyramid feature map, wherein the areas are cropped by using resized 1-st bounding boxes with (1_1)-st widths and (1_1)-st heights and wherein the (1_1)-st widths and the (1_1)-st heights are acquired by multiplying (1) a ratio of the (1_1)-st specific pyramid feature map corresponding to the 1-st specific scale and the t-th frame (2) to 1-st widths and 1-st heights of the 1-st bounding boxes, such that the 1-st bounding boxes correspond to the 1-st specific scale, and (ii) generate the (1_1)-st cropped feature map by resizing the (1_1)-st widths and the (1_1)-st heights such that the (1_1)-st cropped feature map is larger than the 1-st bounding boxes and has a ratio of width to height that is same as the 1-st bounding boxes.

As one example, in a process of generating the (1_1)-st cropped feature map by cropping and resizing the areas corresponding to the resized 1-st bounding boxes, the object tracking device determines each of location coordinates on the (1_1)-st specific pyramid feature map corresponding to each of pixels on the (1_1)-st cropped feature map, and generates each of weighted sums for feature values of four integer pixels surrounding each of the location coordinates on the (1_1)-st specific pyramid feature map as each of feature values for each pixel on the (1_1)-st cropped feature map.

As one example, at the step of (b), the object tracking device (i) generates the (1_1)-st conversion feature map and a (2_1)-st conversion feature map, wherein the (1_1)-st conversion feature map is acquired by converting each of the 1-st features of the 1-st cropped feature map to the 1-st feature descriptors containing the feature information and the location information of each of the 1-st features through performing operations related to self-attention and cross-attention on each of the (1_1)-st cropped feature map and the (2_1)-st specific pyramid feature map, wherein the (2_1)-st conversion feature map is acquired by converting each of the 2-nd features of the (2_1)-st specific pyramid feature map into the 2-nd feature descriptors containing the feature information and the location information of each of the 2-nd features, (ii) calculates each of the 1-st matching probabilities of each of descriptor pairs by matching each of the 1-st feature descriptors on the (1_1)-st conversion feature map and each of the 2-nd feature descriptors on the (2_1)-st conversion feature map, and (iii) acquires each of the 1-st matching pairs by using location information on specific 1-st feature descriptors and location information on specific 2-nd feature descriptors excluding outliers among specific descriptor pairs having the 1-st matching probabilities greater than the preset threshold.

As one example, at the step of (a), in a process of performing the object detection on the 1-st combined feature map in which the (1_1)-st pyramid feature map to the (1_k)-th pyramid feature map are combined, the object tracking device generates RoIs for area candidates predicted to have the 1-st objects on the t-th frame by referring to the 1-st combined feature map through an RPN, generates each of pooled feature maps corresponding to each of the RoIs by performing RoI pooling operation on each of the area candidates corresponding to the RoIs on the 1-st combined feature map through a pooling layer, generates each of pieces of regression information corresponding to each of the RoIs by performing FC operation on the pooled feature maps through one or more FC (Fully-Connected) layers, and acquires the 1-st bounding boxes corresponding to the 1-st objects located on the 1-st frame by referring to the pieces of regression information corresponding to each of the RoIs.

In accordance with another aspect of the present disclosure, there is provided an object tracking device for tracking an object in a low frame rate video, including: at least one memory that stores instructions; and at least one processor configured to execute the instructions to perform or support another device to perform processes of: (I) in response to acquiring a video image including a plurality of frames from an imaging device, (i) inputting a t-th frame corresponding to a current time among the plurality of frames into an object detection network, thereby instructing the object detection network to input the t-th frame into FPN (Feature Pyramid Network) and thus generate each of a (1_1)-st pyramid feature map to a (1_k)-th pyramid feature map corresponding to each of a 1-st scale to a k-th scale, wherein the k is an integer of two or more, and (ii) performing an object detection on a 1-st combined feature map, in which the (1_1)-st pyramid feature map to the (1_k)-th pyramid feature map are combined, and thus detect 1-st objects contained in a 1-st frame, thereby acquiring 1-st bounding boxes corresponding to the 1-st objects, and imparting unique IDs to the 1-st objects; and (II) (i) (i–1) inputting a (t+1)-th frame which is a next frame of the t-th frame into the object detection network, thereby instructing the object detection network to input the (t+1)-th frame into the FPN and thus generate each of a (2_1)-st pyramid feature map to a (2_k)-th pyramid feature map corresponding to the 1-st scale to the k-th scale and (i–2) performing an object detection on a 2-nd combined feature map, in which the (2_1)-st pyramid feature map to the (2_k)-th pyramid feature map are combined, and thus detect 2-nd objects contained in the (t+1)-th frame, thereby acquiring 2-nd bounding boxes corresponding to the 2-nd objects, (ii) (ii–1) generating a (1_1)-st cropped feature map acquired by cropping regions corresponding to the 1-st bounding boxes from a (1_1)-st specific pyramid feature map corresponding to a 1-st specific scale among the (1_1)-st pyramid feature map to the (1_k)-st specific pyramid feature map, (ii–2) inputting the (1_1)-st cropped feature map and a (2_1)-st specific pyramid feature map respectively into a 1-st self-attention layer and a 1-st cross attention layer, wherein the (2_1)-st specific pyramid feature map corresponds to the 1-st specific scale among the (2_1)-st pyramid feature map to the (2_k)-th pyramid feature map, thereby instructing the 1-st self-attention layer and the 1-st cross attention layer to respectively perform operations related to self-attention and operations related to cross-attention on the (1_1)-st cropped feature map and the (2_1)-st specific pyramid feature map and thus generate a (1_1)-st conversion feature map and a (2_1)-st conversion feature map, wherein the (1_1)-st conversion feature map is acquired by converting each of 1-st features of the 1-st cropped feature map to 1-st feature descriptors containing feature information and location information of each of the 1-st features and wherein the (2_1)-st conversion feature map is acquired by converting each of 2-nd features of the (2_1)-st specific pyramid feature map to 2-nd feature descriptors containing feature information and location information of each of the 2-nd features, and (ii-3) inputting the (1_1)-st conversion feature map and the (2_1)-st conversion feature map into a matching layer, thereby instructing the matching layer to acquire 1-st matching pairs by using 1-st matching probabilities acquired by matching the 1-st feature descriptors on the (1_1)-st conversion feature map and the 2-nd feature descriptors on the (2_1)-st conversion feature map, and (iii) selecting a specific 2-nd bounding box containing specific 2-nd features the most corresponding to specific 2-nd feature descriptors according to the 1-st matching pairs among the 2-nd bounding boxes, and imparting a specific unique ID identical to that of a specific 1-st object to a specific 2-nd object, wherein the specific 1-st object corresponds to a specific 1-st bounding box and the specific 2-nd object corresponds to the specific 2-nd bounding box, thereby performing object tracking.

As one example, there is disclosed the object tracking device characterized in that, at the process of (II), on condition that the 1-st matching pairs have been acquired, the processor (i) (i–1) generates (1_2)-st cropped feature map acquired by cropping regions corresponding to the 1-st bounding boxes in a (1_2)-nd specific pyramid feature map corresponding to a 2-nd specific scale among the (1_1)-st pyramid feature map to the (1_k)-th pyramid feature map, wherein the 2-nd specific scale is a greater scale than the 1-st specific scale, (i–2) selects a (2_2)-nd specific pyramid feature map corresponding to the 2-nd specific scale among the (2_1)-st pyramid feature map to the (2_k)-th pyramid feature map, (i–3) converts specific 1-st feature descriptors and the specific 2-nd feature descriptors corresponding to the 1-st matching pairs respectively to 1-st feature descriptors of the (1_2)-nd cropped feature map and 2-nd feature descriptors on the (2_2)-nd specific pyramid feature map, (i–4) inputs 1-st windows cropped to include each of the 1-st feature descriptors of the (1_2)-nd cropped feature map and 2-nd windows cropped to include each of the 2-nd feature descriptors on the (2_2)-nd specific pyramid feature map into a 2-nd self-attention layer and a 2-nd cross-attention layer, thereby instructing the 2-nd self-attention layer and the 2-nd cross attention layer to respectively perform operations related to self-attention and operations related to cross-attention on the 1-st windows and the 2-nd windows and thus generate (1_2)-nd conversion feature maps centering each of the 1-st feature descriptors on the (1_2)-nd cropped feature map and (2_2)-nd conversion feature maps centering each of the 2-nd feature descriptors on the (2_2)-nd specific pyramid feature map, and (i–5) generate specific 1-st feature descriptors on the (1_2)-nd cropped feature map corresponding to central vectors of the (1_2)-nd conversion feature maps and specific 2-nd feature descriptors on the (2_2)-nd specific pyramid feature map corresponding to specific vectors of the (2_2)-nd conversion feature maps matching with the specific 1-st feature descriptors, thereby generating 2-nd matching pairs, by using heatmaps indicating 2-nd matching probabilities generated by correlating the central vectors of the (1_2)-nd conversion feature maps with all vectors of the (2_2)-nd conversion feature maps corresponding to each of the (1_2)-nd conversion feature maps and performing softmax operation thereon, and (ii) selects a specific 2-nd bounding box containing specific 2-nd features the most corresponding to the specific 2-nd feature descriptors according to the 2-nd matching pairs among the 2-nd bounding boxes, thereby imparting the specific unique ID identical to that of the specific 1-st object corresponding to the specific 1-st bounding box to the specific 2-nd object corresponding to the specific 2-nd bounding box and thus performing the object tracking.

As one example, there is disclosed the object tracking device characterized in that, prior to the process of (I), the processor (i) performs the object detection and the object tracking for t-th frame for training and (t+1)-th frame for training, thereby acquiring 1-st matching pairs for training and 2-nd matching pairs for training, (ii) trains at least part of weights of the 1-st self-attention layer, weights of the 1-st cross-attention layer and weights of the matching layer as learning processes for the 1-st matching pairs for training by using negative log-likelihood loss for 1-st matching probabilities for training, and (iii) trains at least part of weights of the 2-nd self-attention layer and weights of the 2-nd cross-attention layer as learning processes for the 2-nd matching pairs for training by using ground truth descriptors corresponding to feature descriptors for training of specific vectors for training of (2_2)-nd conversion feature map for training and total variance of heatmap for training with respect to 2-nd matching probabilities for training.

As one example, there is disclosed the object tracking device characterized in that, at the process of (II), the processor (i) adds (1) leveled feature maps acquired by converting each of the (1_1)-st cropped feature map and the (2_1)-st specific pyramid feature map into each one-dimension vector, and (2) a position conversion map acquired by changing (x, y) coordinates which are positional information of features of the (1_1)-st cropped feature map and the (2_1)-st specific pyramid feature map into Random Fourier Features each of which is each sum of a cosine function and a sine function, and performs operations related to self-attention on a summation of said (1) and said (2), to thereby generate a 1-st self-attention result and a 2-nd self-attention result respectively corresponding to the (1_1)-st cropped feature map and the (2_1)-st specific pyramid feature map, and (ii) generates the (1_1)-st conversion feature map and the (2_1)-st conversion feature map by performing operations related to cross-attention on the 1-st self-attention result and the 2-nd self-attention result.

As one example, there is disclosed the object tracking device characterized in that, at the process of (II), the processor (i) crops the areas corresponding to the 1-st bounding boxes on the (1_1)-st specific pyramid feature map corresponding to a 1-st specific scale among the (1_1)-st pyramid feature map to the (1_k)-st pyramid feature map, wherein the areas are cropped by using resized 1-st bounding boxes with (1_1)-st widths and (1_1)-st heights and wherein the (1_1)-st widths and the (1_1)-st heights are acquired by multiplying (1) a ratio of the (1_1)-st specific pyramid feature map corresponding to the 1-st specific scale and the t-th frame (2) to 1-st widths and 1-st heights of the 1-st bounding boxes, such that the 1-st bounding boxes correspond to the 1-st specific scale, and (ii) generate the (1_1)-st cropped feature map by resizing the (1_1)-st widths and the (1_1)-st heights such that the (1_1)-st cropped feature map is larger than the 1-st bounding boxes and has a ratio of width to height that is same as the 1-st bounding boxes.

As one example, there is disclosed the object tracking device characterized in that, in a process of generating the (1_1)-st cropped feature map by cropping and resizing the areas corresponding to the resized 1-st bounding boxes, the processor determines each of location coordinates on the (1_1)-st specific pyramid feature map corresponding to each of pixels on the (1_1)-st cropped feature map, and generates each of weighted sums for feature values of four integer pixels surrounding each of the location coordinates on the (1_1)-st specific pyramid feature map as each of feature values for each pixel on the (1_1)-st cropped feature map.

As one example, there is disclosed the object tracking device characterized in that, at the process of (II), the processor (i) generates the (1_1)-st conversion feature map and a (2_1)-st conversion feature map, wherein the (1_1)-st conversion feature map is acquired by converting each of the 1-st features of the 1-st cropped feature map to the 1-st feature descriptors containing the feature information and the location information of each of the 1-st features through performing operations related to self-attention and cross-attention on each of the (1_1)-st cropped feature map and the (2_1)-st specific pyramid feature map, wherein the (2_1)-st conversion feature map is acquired by converting each of the 2-nd features of the (2_1)-st specific pyramid feature map into the 2-nd feature descriptors containing the feature information and the location information of each of the 2-nd features, (ii) calculates each of the 1-st matching probabilities of each of descriptor pairs by matching each of the 1-st feature descriptors on the (1_1)-st conversion feature map and each of the 2-nd feature descriptors on the (2_1)-st conversion feature map, and (iii) acquires each of the 1-st matching pairs by using location information on specific 1-st feature descriptors and location information on specific 2-nd feature descriptors excluding outliers among specific descriptor pairs having the 1-st matching probabilities greater than the preset threshold.

As one example, there is disclosed the object tracking device characterized in that, at the process of (I), in a process of performing the object detection on the 1-st combined feature map in which the (1_1)-st pyramid feature map to the (1_k)-th pyramid feature map are combined, the processor generates RoIs for area candidates predicted to have the 1-st objects on the t-th frame by referring to the 1-st combined feature map through an RPN, generates each of pooled feature maps corresponding to each of the RoIs by performing RoI pooling operation on each of the area candidates corresponding to the RoIs on the 1-st combined feature map through a pooling layer, generates each of pieces of regression information corresponding to each of the RoIs by performing FC operation on the pooled feature maps through one or more FC (Fully-Connected) layers, and acquires the 1-st bounding boxes corresponding to the 1-st objects located on the 1-st frame by referring to the pieces of regression information corresponding to each of the RoIs.

In addition, recordable media that are readable by a computer for storing a computer program to execute the method of the present disclosure is further provided.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

FIG. 3 is a drawing schematically illustrating an example of movement of an object(s) between consecutive frames in a video having low frame-rate.

DETAILED DESCRIPTION OF THE PREFERRED EMBODIMENTS

Figure 1:
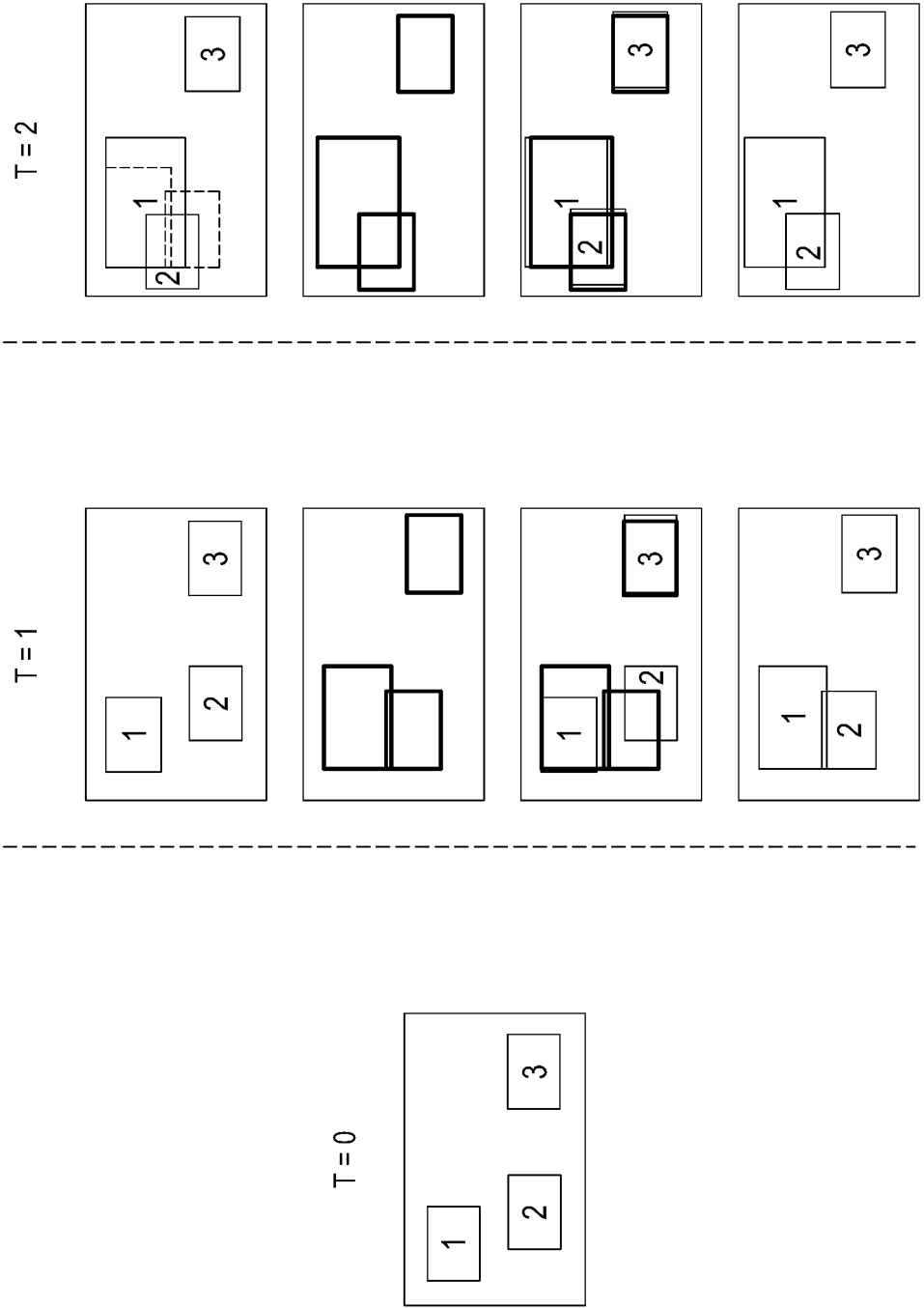
FIG. 1 is a drawing schematically illustrating a conventional technology of performing object tracking by using Motion Model.
Figure 2:
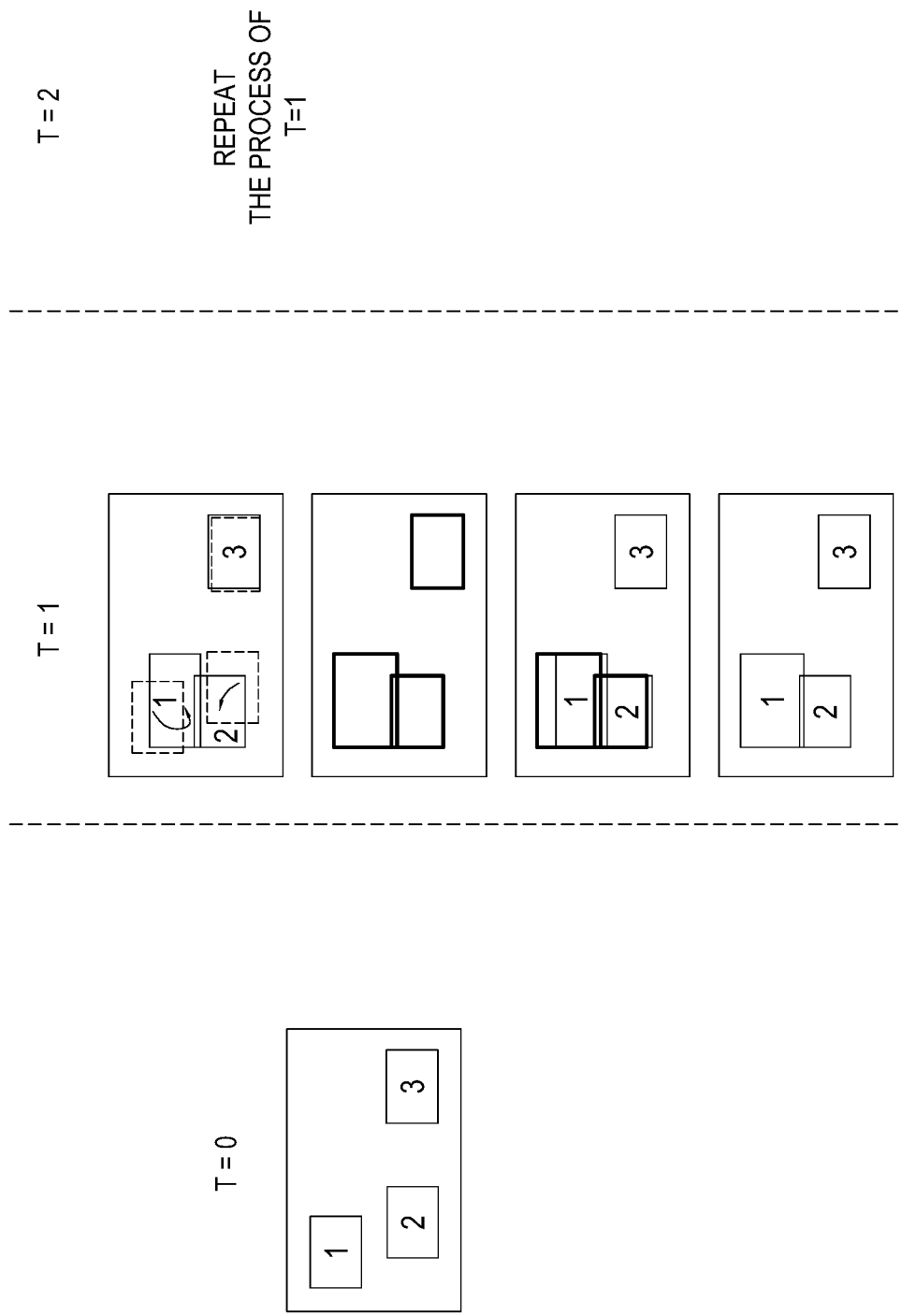
FIG. 2 is a drawing schematically illustrating another conventional technology of performing the object tracking by using density estimation.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

Figure 4:
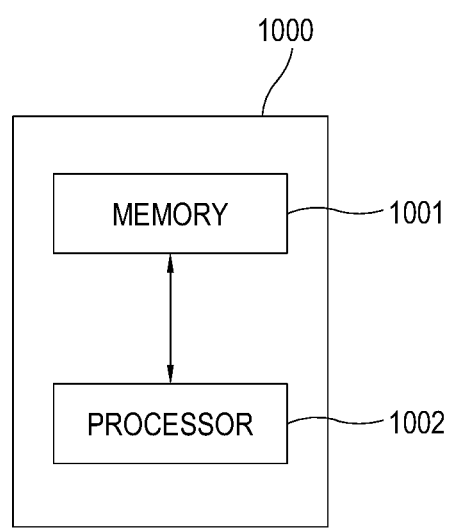
FIG. 4 is a drawing schematically illustrating an object tracking device for tracking the object(s) in a low frame-rate video in accordance with one example embodiment of the present disclosure.

FIG. 4 is a drawing schematically illustrating an object tracking device 1000 for tracking an object(s) in a low frame-rate video in accordance with one example embodiment of the present disclosure.

Referring to FIG. 4, the object tracking device 1000 may include a memory 1001 that stores instructions for tracking an object(s) in a low frame rate video and a processor 1002 configured to execute or support another device to execute the instructions for tracking the object in the low frame rate video.

Specifically, the object tracking device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the object tracking device 1000 is a device for performing a task of tracking an object in a low frame rate video, and may perform training and testing of a neural network (included in or interlocked with the object tracking device 1000) for tracking the object in the low frame rate video.

A method for tracking the object in the low frame rate video in accordance with one example embodiment of the present disclosure by using the object tracking device 1000 configured as above can be explained by referring to FIG. 5 to FIG. 9 as follows.

Figure 5:
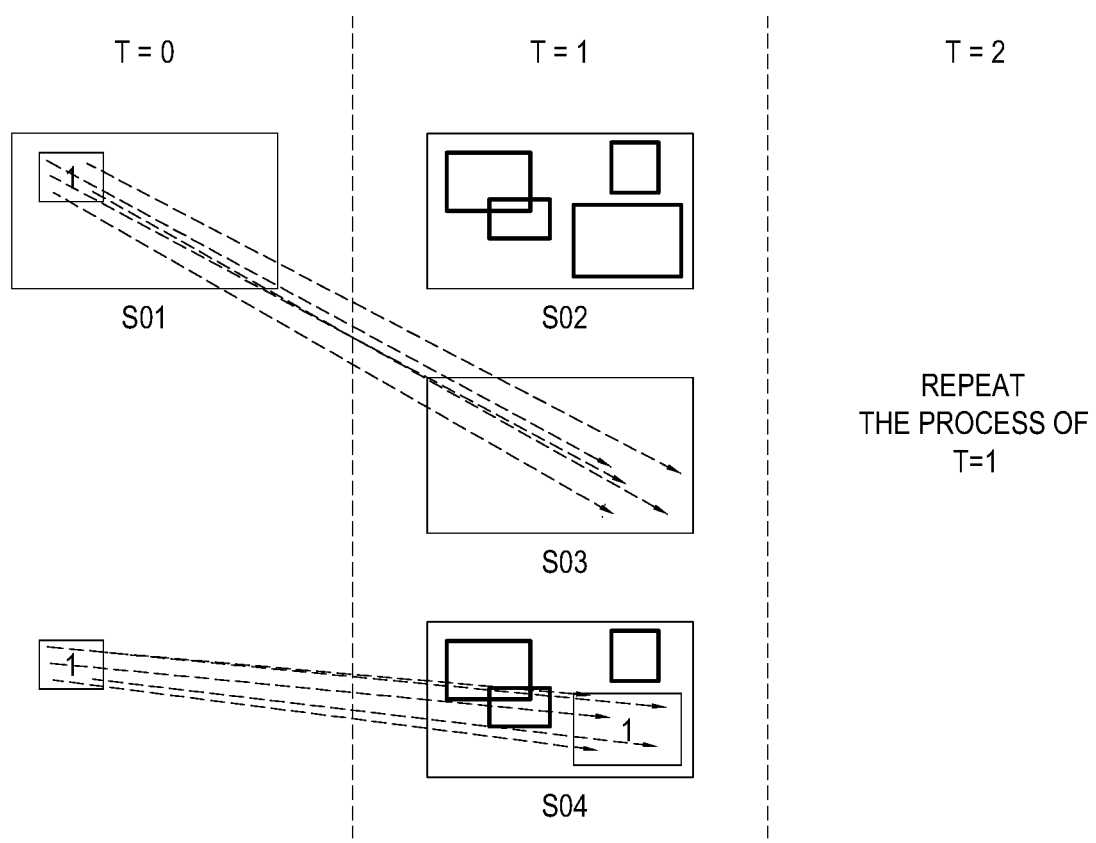
FIG. 5 is a drawing schematically illustrating a process of tracking the object(s) in the low frame-rate video in accordance with one example embodiment of the present disclosure.

Firstly, FIG. 5 is a drawing schematically illustrating a process of tracking the object in the low frame-rate video in accordance with one example embodiment of the present disclosure.

Referring to FIG. 5, the object tracking device 1000 may perform an object detection on a t-th frame corresponding to a current time t (for example: t=0) first, and thus detect at least one 1-st object contained in the t-th frame, thereby acquiring a 1-st bounding box corresponding to the 1-st object (area marked as 1) and imparting a unique ID to the 1-st object at a step of S01. Herein, in FIG. 5, only one bounding box corresponding to one 1-st object is marked for the convenience, but the present invention is not limited thereto, and may be identically applied to multiple tracking of multiple objects.

Further, the object tracking device 1000 may perform an object detection on a (t+1)-th frame which is a next frame of the t-th frame, and thus detect one or more 2-nd objects contained in the (t+1)-th frame, thereby acquiring 2-nd bounding boxes corresponding to the 2-nd objects (thick box) at a step of S02. Next, the object detection device 1000 may generate a cropped feature map by cropping and resizing the 1-st bounding box corresponding to the 1-st object, and extract matching pairs between the cropped feature map and a feature map for the whole area of the (t+1)-th frame at a step of S03. Herein, in order to extract the matching pairs, fast local feature matching algorithm, etc. may be used. After acquiring the matching pairs, the object detection device 1000 selects a specific 2-nd bounding box (as shown in a thin box of S04) containing the matching pairs the most related to the 1-st bounding box corresponding to the 1-st object as a bounding box corresponding to the 1-st object in the (t+1)-th frame, and imparts a specific unique ID corresponding to the 1-st object to the specific 2-nd bounding box at a step of S04. As above, the process performed in the frame of t=1 may be repeated in every frame (example: t=2, 3, 4, . . . ).

Specifically, a method for tracking the object in the low frame-rate video in accordance with one example embodiment of the present disclosure is provided as follows.

Figure 6:
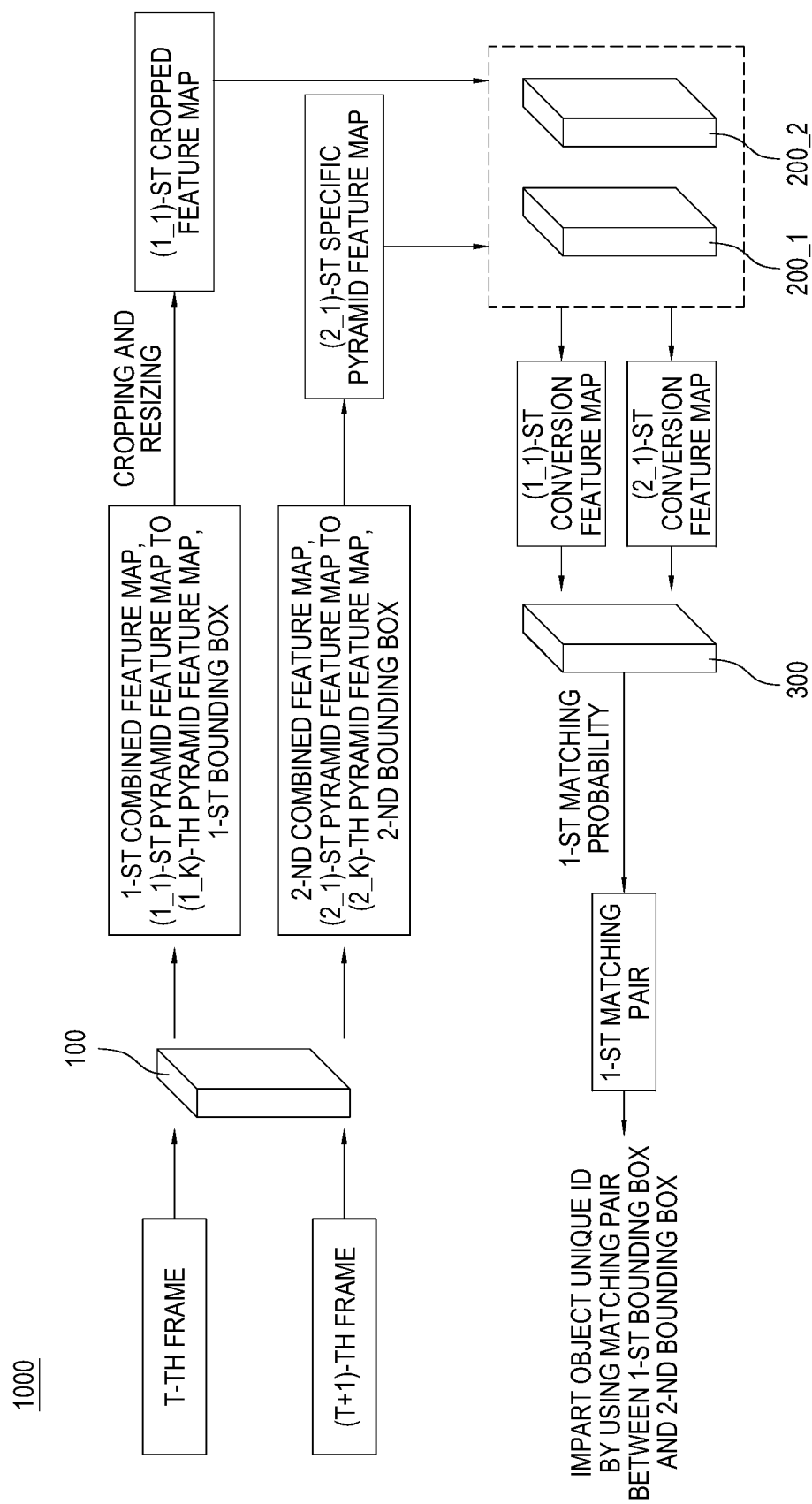
FIG. 6 is a drawing schematically illustrating a method for generating a first matching pair to track the object(s) in the low frame-rate video in accordance with one example embodiment of the present disclosure.

Firstly, FIG. 6 is a drawing schematically illustrating a method for generating a first matching pair for tracking the object in the low frame-rate video in accordance with one example embodiment of the present disclosure.

According to FIG. 6, in response to acquiring a video image including a plurality of frames from an imaging device, the object tracking device 1000 may (i) input a t-th frame corresponding to a current time among the plurality of frames into an object detection network 100, thereby instructing the object detection network 100 to input the t-th frame into FPN (Feature Pyramid Network) and thus generate each of a (1_1)-st pyramid feature map to a (1_k)-th pyramid feature map corresponding to each of a 1-st scale to a k-th scale, wherein the k is an integer of two or more, and (ii) perform an object detection on a 1-st combined feature map, in which the (1_1)-st pyramid feature map to the (1_k)-th pyramid feature map are combined, and thus detect 1-st objects contained in a 1-st frame, thereby acquiring 1-st bounding boxes corresponding to the 1-st objects and imparting unique IDs to the 1-st objects. Herein, for each of the unique IDs, if there already exists each of IDs corresponding to each of the 1-st objects, each of the unique IDs identical to the previous frame may be imparted, and if some IDs corresponding to some of the 1-st objects do not exist, new unique IDs may be generated and be imparted to said some of the 1-st objects. That is, each of the unique IDs for each of the 1-st objects may be imparted by performing the object tracking between a (t−1)-th frame and the t-th frame.

Likewise, the object tracking device 1000 may (i) input a (t+1)-th frame which is a next frame of the t-th frame into the object detection network 100, thereby instructing the object detection network 100 to input the (t+1)-th frame into the FPN and thus generate each of a (2_1)-st pyramid feature map to a (2_k)-th pyramid feature map corresponding to the 1-st scale to the k-th scale and (ii) perform an object detection on a 2-nd combined feature map, in which the (2_1)-st pyramid feature map to the (2_k)-th pyramid feature map are combined, and thus detect 2-nd objects contained in the (t+1)-th frame, thereby acquiring 2-nd bounding boxes corresponding to the 2-nd objects.

Figure 7:
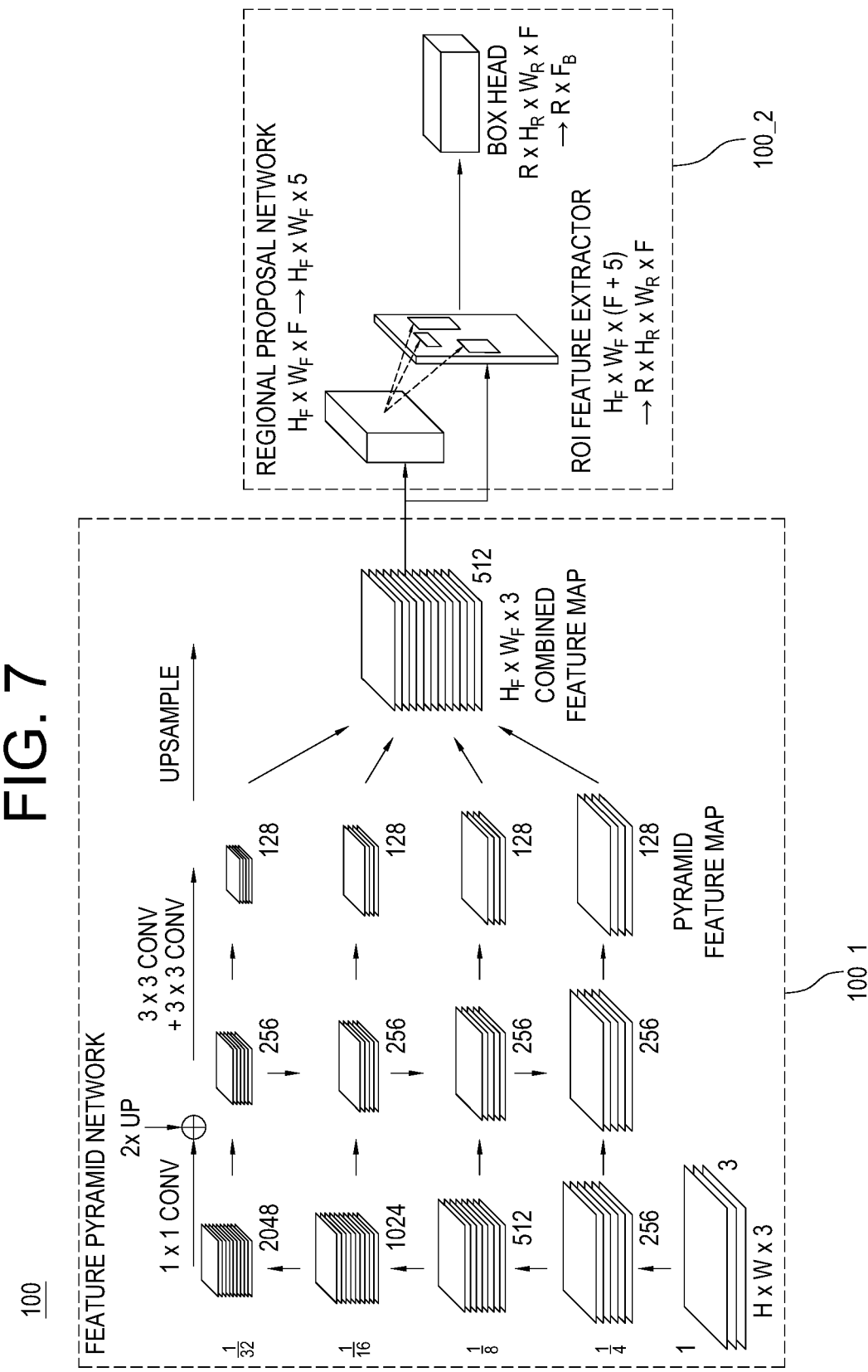
FIG. 7 is a drawing schematically illustrating a method for generating pyramid feature maps and bounding boxes to track the object(s) in the low frame-rate video in accordance with one example embodiment of the present disclosure.

Herein, FIG. 7 is a drawing schematically illustrating a method for generating pyramid feature maps and bounding boxes for tracking objects in the low frame-rate video in accordance with one example embodiment of the present disclosure.

According to FIG. 7, the object detection network 100 may include an FPN (Feature Pyramid Network; 100_1) and an RPN (Regional Proposal Network; 100_2), wherein the FPN generates a pyramid feature map and a combined feature map and the RPN generates a bounding box by performing object detection on the combined feature map.

Firstly, the FPN (100_1) for generating pyramid feature maps of various scales may (i) input each of a t-th frame and a (t+1)-th frame into a plurality of convolution layers to generate each of feature maps corresponding to each of the frames for each of the convolution layers, (ii) generate intermediate feature maps of various scales by combining each of upsampled upper feature maps (2× UP) and each of their lower feature maps top down from its upper convolution layer, and (iii) generate the pyramid feature maps of various scales by combining their corresponding intermediate feature maps top down from its upper convolution layer. Further, the FPN 100_1 may generate a combined feature map by upsampling and combining the pyramid feature maps.

Next, the RPN 100_2 may (i) generate RoIs for area candidates predicted to have objects in a frame by referring to the combined feature map, (ii) generate each of pooled feature maps corresponding to each of the RoIs by performing RoI pooling operation on each of the area candidates corresponding to each of the RoIs on the combined feature map through a pooling layer, (iii) generate each of pieces of regression information corresponding to each of the RoIs by performing FC operation on the pooled feature maps through one or more FC (Fully-Connected) layers, and (iv) acquire the 1-st bounding boxes in the t-th frame from the 1-st combined feature map and the 2-nd bounding boxes in (t+1)-th frame from the 2-nd combined feature map by referring to the pieces of regression information corresponding to each of the RoIs.

Referring to FIG. 6 again, the object tracking device 1000 may generate a (1_1)-st cropped feature map acquired by cropping regions corresponding to the 1-st bounding boxes from a (1_1)-st specific pyramid feature map corresponding to a 1-st specific scale among the (1_1)-st pyramid feature map to the (1_k)-st pyramid feature map.

Figure 8:
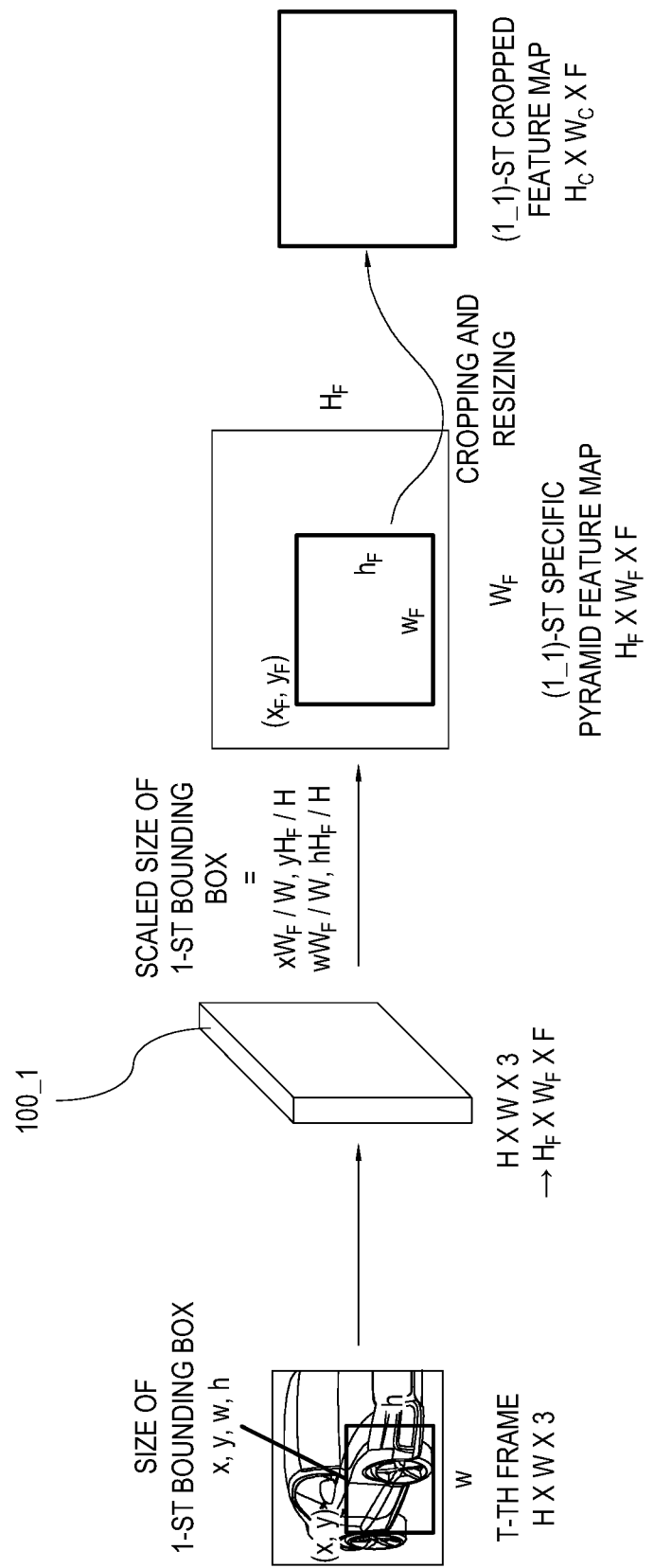
FIG. 8 is a drawing schematically illustrating a method for generating a cropped feature map to track the object(s) in the low frame-rate video in accordance with one example embodiment of the present disclosure.

Herein, FIG. 8 is a drawing schematically illustrating a method for generating a cropped feature map for tracking the object in the low frame-rate video in accordance with one example embodiment of the present disclosure.

Specifically, the object tracking device 1000 may (i) crop the areas corresponding to the 1-st bounding boxes on the (1_1)-st specific pyramid feature map corresponding to the 1-st specific scale among the (1_1)-st pyramid feature map to the (1_k)-th pyramid feature map, wherein the areas are cropped by using resized 1-st bounding boxes with (1_1)-st widths and (1_1)-st heights and wherein the (1_1)-st widths and the (1_1)-st heights are acquired by multiplying (1) a ratio of the (1_1)-st specific pyramid feature map corresponding to the 1-st specific scale and the t-th frame to (2) 1-st widths and 1-st heights of the 1-st bounding boxes, such that the 1-st bounding boxes correspond to the 1-st specific scale (ii) generate the (1_1)-st cropped feature map by resizing the (1_1)-st widths and the (1_1)-st heights such that the resized 1-st bounding boxes are larger than the 1-st bounding boxes while ratios of width to height of the resized 1-st bounding boxes are same as those of the 1-st bounding boxes.

As one example, referring to FIG. 8, in case a size of the t-th frame is H×W×3 and a size of the (1_1)-th specific pyramid feature map is $H_F \times W_F \times F$, a location and a size of the 1-st bounding box corresponding to the t-th frame is (x, y, w, h), that is, if it is assumed that a top left coordinate of the 1-st bounding box is (x, y) and a size of the 1-st bounding box is (w, h), values for ($x_F$, $y_F$, $w_F$, $h_F$) which are the location and the size of the 1-st bounding box on the (1_1)-st specific pyramid feature map can be determined respectively as $x_F = x \cdot W_F/W$, $y_F = y \cdot H_F/H$, $w_F = w \cdot W_F/W$, $h_F = h \cdot H_F/H$. Herein, each of $x_F$, $y_F$, $w_F$, $h_F$ need not be an integer value but may be a decimal value, and thus in order to accurately crop an area corresponding to a decimal point, a method of Bilinear Crop & Resizing may be used.

Accordingly, a process of finding feature values of vertices of the area corresponding to the 1-st bounding box in the (1_1)-st specific pyramid feature map can be explained as an example as follows. For reference, the number of channels of the (1_1)-st specific pyramid feature map is F, and thus the feature values are not one value but represented as a vector whose length is F, but for the convenience of explanation, the explanation is carried out with an assumption that it is a value in a specific channel, and the method for finding all the feature values accordingly can be applied the same in all the channels.

For example, if a coordinate value of a vertex is $x_F = 1.4$ and $y_F = 3.8$, the vertex becomes located inside a rectangle comprised of four pixels of (1, 3), (2, 3), (1, 4) and (2, 4) in the (1_1)-st specific pyramid feature map. Accordingly, a feature value at (1.4, 3.8) becomes a weighted sum of each of feature values of each of the four pixels, and each of weights for each of the pixels may be set larger if the corresponding pixel is closer to its corresponding vertex. For example, (1.4, 3.8) and (1, 3) are away from each other as much as (0.4, 0.8) horizontally and vertically, and thus the weight becomes (1−0.4)*(1−0.8)=0.12, and by the same method, the weight for (2, 3) becomes 0.4*0.2=0.08, and the weight for (1, 4) becomes 0.6*0.8=0.48, and the weight for (2, 4) becomes 0.4*0.8=0.32. Herein, adding the four weights, it always becomes 1. Accordingly, the feature value of (1.4, 3.8) would become 0.12*[feature value of (1, 3)]+0.08*[feature value of (2, 3)]+0.48*[feature value of (1, 4)]+0.32*[feature value of (2, 4)].

Accordingly, in the process of generating the (1_1)-st cropped feature map by cropping and resizing the areas corresponding to the resized 1-st bounding boxes, the object tracking device 1000 may (i) determine each of location coordinates on the (1_1)-st specific pyramid feature map corresponding to each of pixels on the (1_1)-st cropped feature map and (ii) generate each of weighted sums for feature values of four integer pixels surrounding each of the location coordinates on the (1_1)-st specific pyramid feature map as each of feature values for each pixel on the (1_1)-st cropped feature map.

Further, in the present disclosure, without using $w_F$, $h_F$ which are scaled size of the bounding box as the size of the cropped feature map as it is, but resizing may be performed on the cropped feature map with an integer value of the desired size. Accordingly, in FIG. 8, the size of the cropped feature map generated by resizing as such has been expressed as wc and hc. Herein, when determining the size of wc and hc, as mentioned before, it shall not be smaller than $w_F$ and $h_F$ to prevent unnecessary damage due to the information loss, and by maintaining the horizontal to vertical ratio of $w_F$ and $h_F$ (i.e., the aspect ratio), inaccurate local feature matching due to the distortion of the aspect ratio is prevented. That is, this means that the sizes of wc and hc are determined according to each of the sizes of each of the bounding boxes.

Explaining this with an example, if $w_F$=7.7, $h_F$=5.3, and the size of the (1_1)-st cropped feature map is set as an integer value that has been scaled 10 times, it may be that wc=77 and hc=53. If it is scaled as above, 77 pixels in horizontal direction and 53 pixels in vertical direction exist, and thus the 77 horizontal and 53 vertical feature values may be calculated respectively with identical interval for the (1_1)-st cropped feature map, from the top left vertex (1.4, 3.8) to the bottom right vertex (1.4+7.7, 3.8+5.3).

In the above, the top left vertex, that is, horizontally 1-st and vertically 1-st feature value has been already calculated, and thus the method for calculating horizontally 3-rd and vertically 4-th feature value is explained for example below.

Firstly, horizontally, the 1-st location is 1.4 and the 77-th location is 1.4+7.7=9.1, and thus horizontally the 3-rd location becomes 1.4+7.7*(3−1)/77−1)=about 1.60263, and similarly vertically 4-th location becomes 3.8+5.3*(4−1)/(53−1)=4.10577. That is, horizontally 3-rd and vertically 4-th feature value becomes the weight sum of the feature values at (1, 4), (2, 4), (1, 5) and (2, 5) which are four integer pixels surrounding the coordinates (1.60263, 4.10577) in the feature map, and the method for calculating the weight sum is identical to the method for calculating the vertices. With such a method, the (1_1)-st cropped feature map of any desired size is generated for each of the 1-st bounding boxes in the (1_1)-st specific pyramid feature map for the entire frame.

Further, referring to FIG. 6 again, the object tracking device 1000 may input the (1_1)-st cropped feature map and a (2_1)-st specific pyramid feature map respectively into a 1-st self-attention layer 200_1 and a 1-st cross attention layer 200_2, wherein the (2_1)-st specific pyramid feature map corresponds to the 1-st specific scale among the (2_1)-st pyramid feature map to the (2_k)-th pyramid feature map, thereby instructing the 1-st self-attention layer and the 1-st cross attention layer to respectively perform operations related to self-attention and operations related to cross-attention on the (1_1)-st cropped feature map and the (2_1)-st specific pyramid feature map and thus generate a (1_1)-st conversion feature map and a (2_1)-st conversion feature map, wherein the (1_1)-st conversion feature map is acquired by converting each of 1-st features of the 1-st cropped feature map to 1-st feature descriptors containing feature information and location information of each of the 1-st features and wherein the (2_1)-st conversion feature map is acquired by converting each of 2-nd features of the (2_1)-st specific pyramid feature map to 2-nd feature descriptors containing feature information and location information of each of the 2-nd features.

Specifically, the object tracking device 1000 may (i) add (1) leveled feature maps acquired by converting each of the (1_1)-st cropped feature map and the (2_1)-st specific pyramid feature map into each one-dimension vector, and (2) a position conversion map acquired by changing (x, y) coordinates which are positional information of features of the (1_1)-st cropped feature map and the (2_1)-st specific pyramid feature map into Random Fourier Features each of which is each sum of a cosine function and a sine function, and performs operations related to self-attention on a summation of said (1) and said (2), to thereby generate a 1-st self-attention result and a 2-nd self-attention result respectively corresponding to the (1_1)-st cropped feature map and the (2_1)-st specific pyramid feature map, and (ii) generate the (1_1)-st conversion feature map and the (2_1)-st conversion feature map by performing operations related to cross-attention on the 1-st self-attention result and the 2-nd self-attention result.

Herein, Random Fourier Features may convert the (x, y) coordinate in the following manner.

$$\gamma(v)=[\cos(Bv),\sin(Bv)]B{\sim}N(0,\sigma^2)$$

Herein, γ(v) means Random Fourier mapping for v, i.e., the inputted coordinate, and B is a frequency vector. Further, the entry in the frequency vector may be sampled from N(0, $\sigma^2$), and a may be set separately for each of tasks.

The Random Fourier Feature mapping as above may be expressed as program code and implemented as below.

B=SCALE*np.random.normal (shape=(input_dims, NUM_FEATURES))

x=np.concatenate ([np.sin (x@ B), np.cos (x@ B), axis=−1)

x=nn.Dense (x, features=256)

Next, referring to FIG. 6, the object tracking device 1000 may input the (1_1)-st conversion feature map and the (2_1)-st conversion feature map into a matching layer 300, thereby acquiring the 1-st matching pairs by using 1-st matching probabilities matching the 1-st feature descriptors in the (1_1)-st conversion feature map and the 2-nd feature descriptors in the (2_1)-st conversion feature map.

Specifically, the object tracking device 1000 may (i) generate the (1_1)-st conversion feature map and the (2_1)-st conversion feature map, wherein the (1_1)-st conversion feature map is acquired by converting each of the 1-st features of the 1-st cropped feature map to the 1-st feature descriptors containing the feature information and the location information of each of the 1-st features through performing operations related to self-attention and cross-attention on each of the (1_1)-st cropped feature map and the (2_1)-st specific pyramid feature map, wherein the (2_1)-st conversion feature map is acquired by converting each of the 2-nd features of the (2_1)-st specific pyramid feature map into the 2-nd feature descriptors containing the feature information and the location information of each of the 2-nd features, (ii) calculate each of the 1-st matching probabilities of each of descriptor pairs by matching each of the 1-st feature descriptors on the (1_1)-st conversion feature map and each of the 2-nd feature descriptors on the (2_1)-st conversion feature map, and (iii) acquire each of the 1-st matching pairs by using location information on specific 1-st feature descriptors and location information on specific 2-nd feature descriptors excluding outliers among specific descriptor pairs having the 1-st matching probabilities greater than the preset threshold.

Accordingly, the object tracking device 1000 may select a specific 2-nd bounding box containing specific 2-nd features the most corresponding to the specific 2-nd feature descriptors according to the 1-st matching pairs among the 2-nd bounding boxes, and impart a specific unique ID identical to that of a specific 1-st object to a specific 2-nd object, wherein the specific 1-st object corresponds to the specific 1-st bounding box and the specific 2-nd object corresponds to the specific 2-nd bounding box, thereby performing the object tracking.

Meanwhile, in order to increase the accuracy for the object tracking, 2-nd matching pairs acquired by fine-tuning the 1-st matching pairs according to the scale of more precise level may be generated by using the (1_2)-nd specific pyramid feature map and the (2_2)-nd specific pyramid feature map of a larger scale than the 1-st specific scale used earlier, and more accurate object tracking can be performed based thereon. Such a method may be performed through an example of FIG. 9 as follows.

Figure 9:
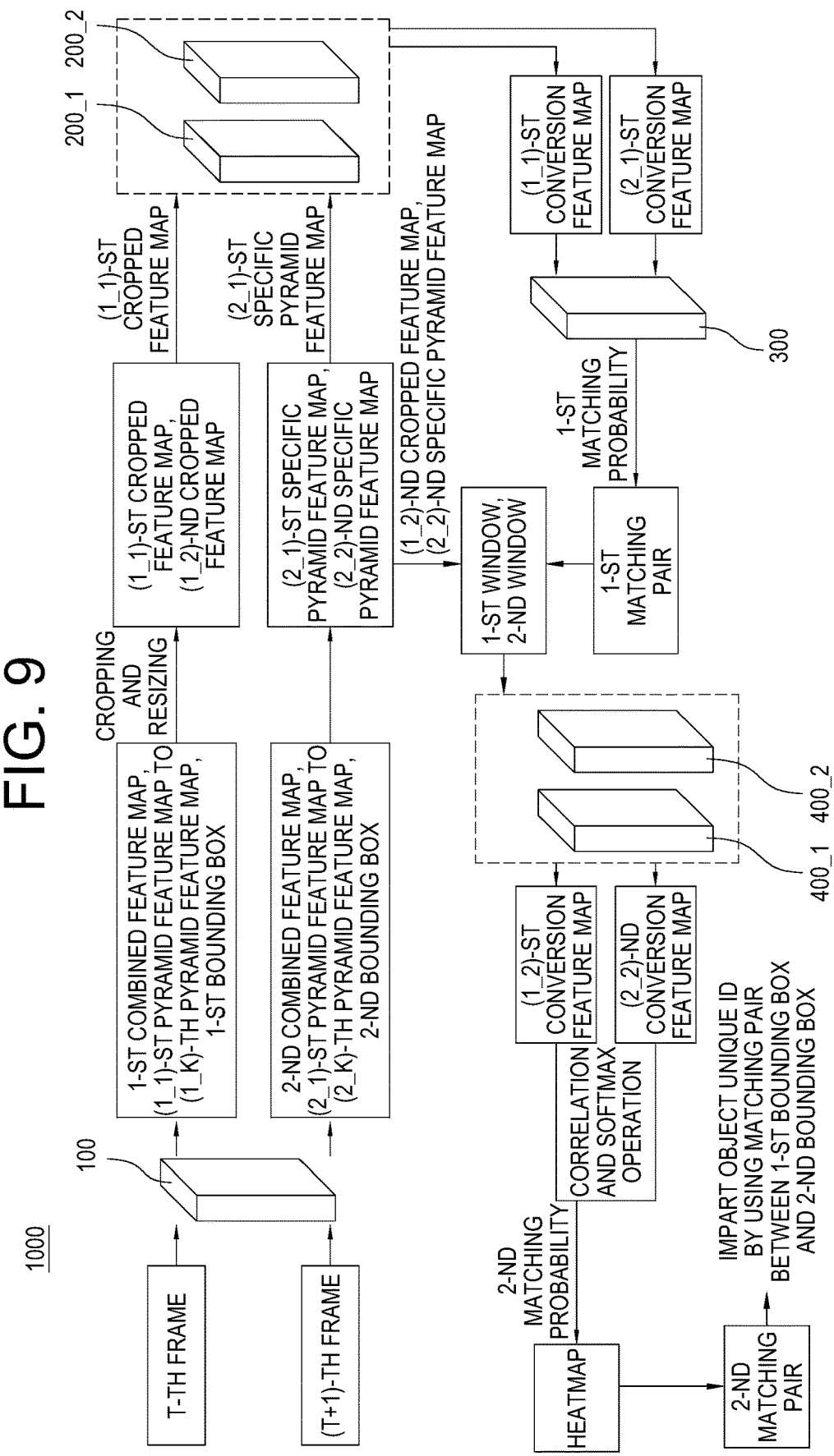
FIG. 9 is a drawing schematically illustrating a method for generating second matching pairs to track the object(s) in the low frame-rate video in accordance with one example embodiment of the present disclosure.

FIG. 9 is a drawing schematically illustrating a method for generating second matching pairs for tracking the object in the low frame-rate video in accordance with one example embodiment of the present disclosure.

According to FIG. 9, the method for generating the 1-st matching pairs from the t-th frame and the (t+1)-th frame is identical to the method explained by referring to FIG. 6.

Accordingly, while generating the 1-st matching pairs with the same method as FIG. 6, the object tracking device 1000 may generate a (1_2)-nd cropped feature map acquired by cropping regions corresponding to the 1-st bounding boxes from a (1_2)-nd specific pyramid feature map corresponding to a 2-nd specific scale among the (1_1)-st pyramid feature map to the (1_k)-st pyramid feature map, and select a (2_2)-nd specific pyramid feature map corresponding to the 2-nd specific scale among the (2_1)-nd pyramid feature map to the (2_k)-th pyramid feature map. Herein, the method for generating the (1_2)-nd cropped feature map in the (1_2)-nd specific pyramid feature map may be identical to the method for generating the (1_1)-st cropped feature map in the (1_1)-st specific pyramid feature map explained above.

Further, the object tracking device 1000 may convert specific 1-st feature descriptors and the specific 2-nd feature descriptors (corresponding to the 1-st matching pairs) to 1-st feature descriptors of the (1_2)-nd cropped feature map and 2-nd feature descriptors of the (2_2)-nd specific pyramid feature map, and generate 1-st windows cropped to include each of the 1-st feature descriptors of the (1_2)-nd cropped feature map and 2-nd windows cropped to include each of the 2-nd feature descriptors of the (2_2)-nd specific pyramid feature map. Herein, the 1-st windows and the 2-nd windows may have the same preset sizes, but the present invention is not limited thereto.

Accordingly, the object tracking device 1000 may input the 1-st windows and the 2-nd windows into a 2-nd self-attention layer 400_1 and a 2-nd cross-attention layer 400_2, thereby instructing the 2-nd self-attention layer 400_1 and the 2-nd cross attention layer 400_2 to respectively perform operations related to self-attention and operations related to cross-attention on the 1-st windows and the 2-nd windows and thus generate (1_2)-nd conversion feature maps centering each of the 1-st feature descriptors on the (1_2)-nd cropped feature map and (2_2)-nd conversion feature maps centering each of the 2-nd feature descriptors on the (2_2)-nd specific pyramid feature map. Herein, when generating the (1_2)-nd conversion feature maps and the (2_2)-nd conversion feature maps, similar to when generating the (1_1)-st conversion feature map and the (2_1)-st conversion feature map, the self-attention is performed first to acquire the self-attention result, and then the cross-attention is performed on the self-attention result to generate the (1_2)-nd conversion feature maps and the (2_2)-nd conversion feature maps.

Next, the object tracking device 1000 may generate specific 1-st feature descriptors on the (1_2)-nd cropped feature map corresponding to central vectors of the (1_2)-nd conversion feature maps and specific 2-nd feature descriptors on the (2_2)-nd specific pyramid feature map corresponding to specific vectors of the (2_2)-nd conversion feature maps matching with the specific 1-st feature descriptors, thereby generating 2-nd matching pairs, by using heatmaps indicating 2-nd matching probabilities generated by correlating the central vectors of the (1_2)-nd conversion feature maps with all vectors of the (2_2)-nd conversion feature maps corresponding to each of the (1_2)-nd conversion feature maps and performing softmax operation thereon.

Accordingly, the object tracking device 1000 may select a specific 2-nd bounding box containing specific 2-nd features the most corresponding to the specific 2-nd feature descriptors according to the 2-nd matching pairs among the 2-nd bounding boxes, thereby imparting the specific unique ID identical to that of the specific 1-st object corresponding to the specific 1-st bounding box to the specific 2-nd object corresponding to the specific 2-nd bounding box and thus performing the object tracking.

While performing the object tracking as above, the object tracking device 1000 may train at least part of weights of the 1-st self-attention layer 200_1, weights of the 1-st cross-attention layer 200_2 and weights of the matching layer 300, weights of the 2-nd self-attention layer 400_1 and weights of the 2-nd cross-attention layer 400_2 through training processes.

Specifically, the object tracking device 1000 may (i) perform the object detection and the object tracking for t-th frame for training and (t+1)-th frame for training, thereby acquiring 1-st matching pairs for training and 2-nd matching pairs for training, (ii) train at least part of weights of the 1-st self-attention layer 200_1, weights of the 1-st cross-attention layer 200_2 and weights of the matching layer 300 as training processes for the 1-st matching pairs for training by using negative log-likelihood loss for 1-st matching probabilities for training.

In addition, the object tracking device 1000 may train at least part of weights of the 2-nd self-attention layer 400_1 and weights of the 2-nd cross-attention layer 400_2 as training processes for the 2-nd matching pairs for training by using ground truth descriptors corresponding to feature descriptors for training of specific vectors for training of (2_2)-nd conversion feature map for training and total variance of heatmap for training with respect to 2-nd matching probabilities for training.

The present disclosure has an effect of performing matching between the consecutive frames by using the conversion feature maps acquired by converting each of the features on the feature maps of the consecutive frames into the feature descriptors including each corresponding feature information and each corresponding location information, thereby allowing the object tracking regardless of whether the time interval per frame is long or short.

The present disclosure has another effect of performing the object tracking by matching the feature descriptors on the plurality of pyramid feature maps on the entire area of the next frame and the feature descriptors on the plurality of cropped feature maps generated by cropping the object areas extracted on the current frame, thereby allowing not only quick matching between the cropped areas and the entire area but also the increased accuracy due to no limitation of the feature searching area.

The present disclosure has still another effect of determining numerous matched feature descriptors in each of the object areas of the current frame and the next frame and thus allow at least part of the feature descriptors to be matched even if the shape, e.g., a pose, an angle, etc., of the objects considerably changes during the long time interval between the consecutive frames in the low-frame video, thereby allowing accurate and stable object tracking.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for tracking an object in a low frame rate video, comprising steps of:
  (a) in response to acquiring a video image including a plurality of frames from an imaging device, an object tracking device (i) inputting a t-th frame corresponding to a current time among the plurality of frames into an object detection network, thereby instructing the object detection network to input the t-th frame into FPN (Feature Pyramid Network) and thus generate each of a (1_1)-st pyramid feature map to a (1_k)-th pyramid feature map corresponding to each of a 1-st scale to a k-th scale, wherein the k is an integer of two or more, and (ii) performing an object detection on a 1-st combined feature map, in which the (1_1)-st pyramid feature map to the (1_k)-th pyramid feature map are combined, and thus detect 1-st objects contained in a 1-st frame, thereby acquiring 1-st bounding boxes corresponding to the 1-st objects, and imparting unique IDs to the 1-st objects; and
  (b) the object tracking device (i) (i–1) inputting a (t+1)-th frame which is a next frame of the t-th frame into the object detection network, thereby instructing the object detection network to input the (t+1)-th frame into the FPN and thus generate each of a (2_1)-st pyramid feature map to a (2_k)-th pyramid feature map corresponding to the 1-st scale to the k-th scale and (i–2) performing an object detection on a 2-nd combined feature map, in which the (2_1)-st pyramid feature map to the (2_k)-th pyramid feature map are combined, and thus detect 2-nd objects contained in the (t+1)-th frame, thereby acquiring 2-nd bounding boxes corresponding to the 2-nd objects, (ii) (ii–1) generating a (1_1)-st cropped feature map acquired by cropping regions corresponding to the 1-st bounding boxes from a (1_1)-st specific pyramid feature map corresponding to a 1-st specific scale among the (1_1)-st pyramid feature map to the (1_k)-st pyramid feature map, (ii–2) inputting the (1_1)-st cropped feature map and a (2_1)-st specific pyramid feature map respectively into a 1-st self-attention layer and a 1-st cross attention layer, wherein the (2_1)-st specific pyramid feature map corresponds to the 1-st specific scale among the (2_1)-st pyramid feature map to the (2_k)-th pyramid feature map, thereby instructing the 1-st self-attention layer and the 1-st cross attention layer to respectively perform operations related to self-attention and operations related to cross-attention on the (1_1)-st cropped feature map and the (2_1)-st specific pyramid feature map and thus generate a (1_1)-st conversion feature map and a (2_1)-st conversion feature map, wherein the (1_1)-st conversion feature map is acquired by converting each of 1-st features of the 1-st cropped feature map to 1-st feature descriptors containing feature information and location information of each of the 1-st features and wherein the (2_1)-st conversion feature map is acquired by converting each of 2-nd features of the (2_1)-st specific pyramid feature map to 2-nd feature descriptors containing feature information and location information of each of the 2-nd features, and (ii–3) inputting the (1_1)-st conversion feature map and the (2_1)-st conversion feature map into a matching layer, thereby instructing the matching layer to acquire 1-st matching pairs by using 1-st matching probabilities acquired by matching the 1-st feature descriptors on the (1_1)-st conversion feature map and the 2-nd feature descriptors on the (2_1)-st conversion feature map, and (iii) selecting a specific 2-nd bounding box containing specific 2-nd features the most corresponding to specific 2-nd feature descriptors according to the 1-st matching pairs among the 2-nd bounding boxes, and imparting a specific unique ID identical to that of a specific 1-st object to a specific 2-nd object, wherein the specific 1-st object corresponds to a specific 1-st bounding box and the specific 2-nd object corresponds to the specific 2-nd bounding box, thereby performing object tracking.

2. The method of claim 1, wherein, at the step of (b), on condition that the 1-st matching pairs have been acquired, the object tracking device (i) (i–1) generates (1_2)-st cropped feature map acquired by cropping regions corresponding to the 1-st bounding boxes in a (1_2)-nd specific pyramid feature map corresponding to a 2-nd specific scale among the (1_1)-st pyramid feature map to the (1_k)-th pyramid feature map, wherein the 2-nd specific scale is a greater scale than the 1-st specific scale, (i–2) selects a (2_2)-nd specific pyramid feature map corresponding to the 2-nd specific scale among the (2_1)-st pyramid feature map to the (2_k)-th pyramid feature map, (i–3) converts specific 1-st feature descriptors and the specific 2-nd feature descriptors corresponding to the 1-st matching pairs respectively to 1-st feature descriptors of the (1_2)-nd cropped feature map and 2-nd feature descriptors on the (2_2)-nd specific pyramid feature map, (i–4) inputs 1-st windows cropped to include each of the 1-st feature descriptors of the (1_2)-nd cropped feature map and 2-nd windows cropped to include each of the 2-nd feature descriptors on the (2_2)-nd specific pyramid feature map into a 2-nd self-attention layer and a 2-nd cross-attention layer, thereby instructing the 2-nd self-attention layer and the 2-nd cross attention layer to respectively perform operations related to self-attention and operations related to cross-attention on the 1-st windows and the 2-nd windows and thus generate (1_2)-nd conversion feature maps centering each of the 1-st feature descriptors on the (1_2)-nd cropped feature map and (2_2)-nd conversion feature maps centering each of the 2-nd feature descriptors on the (2_2)-nd specific pyramid feature map, and (i–5) generate specific 1-st feature descriptors on the (1_2)-nd cropped feature map corresponding to central vectors of the (1_2)-nd conversion feature maps and specific 2-nd feature descriptors on the (2_2)-nd specific pyramid feature map corresponding to specific vectors of the (2_2)-nd conversion feature maps matching with the specific 1-st feature descriptors, thereby generating 2-nd matching pairs, by using heatmaps indicating 2-nd matching probabilities generated by correlating the central vectors of the (1_2)-nd conversion feature maps with all vectors of the (2_2)-nd conversion feature maps corresponding to each of the (1_2)-nd conversion feature maps and performing softmax operation thereon, and (ii) selects a specific 2-nd bounding box containing specific 2-nd features the most corresponding to the specific 2-nd feature descriptors according to the 2-nd matching pairs among the 2-nd bounding boxes, thereby imparting the specific unique ID identical to that of the specific 1-st object corresponding to the specific 1-st bounding box to the specific 2-nd object corresponding to the specific 2-nd bounding box and thus performing the object tracking.

3. The method of claim 2, wherein, prior to the step of (a), the object tracking device (i) performs the object detection and the object tracking for t-th frame for training and (t+1)-th frame for training, thereby acquiring 1-st matching pairs for training and 2-nd matching pairs for training, (ii) trains at least part of weights of the 1-st self-attention layer, weights of the 1-st cross-attention layer and weights of the matching layer as learning processes for the 1-st matching pairs for training by using negative log-likelihood loss for 1-st matching probabilities for training, and (iii) trains at least part of weights of the 2-nd self-attention layer and weights of the 2-nd cross-attention layer as learning processes for the 2-nd matching pairs for training by using ground truth descriptors corresponding to feature descriptors for training of specific vectors for training of (2_2)-nd conversion feature map for training and total variance of heatmap for training with respect to 2-nd matching probabilities for training.

4. The method of claim 1, wherein, at the step of (b), the object tracking device (i) adds (1) leveled feature maps acquired by converting each of the (1_1)-st cropped feature map and the (2_1)-st specific pyramid feature map into each one-dimension vector, and (2) a position conversion map acquired by changing (x, y) coordinates which are positional information of features of the (1_1)-st cropped feature map and the (2_1)-st specific pyramid feature map into Random Fourier Features each of which is each sum of a cosine function and a sine function, and performs operations related to self-attention on a summation of said (1) and said (2), to thereby generate a 1-st self-attention result and a 2-nd self-attention result respectively corresponding to the (1_1)-st cropped feature map and the (2_1)-st specific pyramid feature map, and (ii) generates the (1_1)-st conversion feature map and the (2_1)-st conversion feature map by performing operations related to cross-attention on the 1-st self-attention result and the 2-nd self-attention result.

5. The method of claim 1, wherein, at the step of (b), the object tracking device (i) crops the areas corresponding to the 1-st bounding boxes on the (1_1)-st specific pyramid feature map corresponding to a 1-st specific scale among the (1_1)-st pyramid feature map to the (1_k)-st pyramid feature map, wherein the areas are cropped by using resized 1-st bounding boxes with (1_1)-st widths and (1_1)-st heights and wherein the (1_1)-st widths and the (1_1)-st heights are acquired by multiplying (1) a ratio of the (1_1)-st specific pyramid feature map corresponding to the 1-st specific scale and the t-th frame (2) to 1-st widths and 1-st heights of the 1-st bounding boxes, such that the 1-st bounding boxes correspond to the 1-st specific scale, and (ii) generate the (1_1)-st cropped feature map by resizing the (1_1)-st widths and the (1_1)-st heights such that the (1_1)-st cropped feature map is larger than the 1-st bounding boxes and has a ratio of width to height that is same as the 1-st bounding boxes.

6. The method of claim 5, wherein, in a process of generating the (1_1)-st cropped feature map by cropping and resizing the areas corresponding to the resized 1-st bounding boxes, the object tracking device determines each of location coordinates on the (1_1)-st specific pyramid feature map corresponding to each of pixels on the (1_1)-st cropped feature map, and generates each of weighted sums for feature values of four integer pixels surrounding each of the location coordinates on the (1_1)-st specific pyramid feature map as each of feature values for each pixel on the (1_1)-st cropped feature map.

7. The method of claim 1, wherein, at the step of (b), the object tracking device (i) generates the (1_1)-st conversion feature map and a (2_1)-st conversion feature map, wherein the (1_1)-st conversion feature map is acquired by converting each of the 1-st features of the 1-st cropped feature map to the 1-st feature descriptors containing the feature information and the location information of each of the 1-st features through performing operations related to self-attention and cross-attention on each of the (1_1)-st cropped feature map and the (2_1)-st specific pyramid feature map, wherein the (2_1)-st conversion feature map is acquired by converting each of the 2-nd features of the (2_1)-st specific pyramid feature map into the 2-nd feature descriptors containing the feature information and the location information of each of the 2-nd features, (ii) calculates each of the 1-st matching probabilities of each of descriptor pairs by matching each of the 1-st feature descriptors on the (1_1)-st conversion feature map and each of the 2-nd feature descriptors on the (2_1)-st conversion feature map, and (iii) acquires each of the 1-st matching pairs by using location information on specific 1-st feature descriptors and location information on specific 2-nd feature descriptors excluding outliers among specific descriptor pairs having the 1-st matching probabilities greater than the preset threshold.

8. The method of claim 1, wherein, at the step of (a), in a process of performing the object detection on the 1-st combined feature map in which the (1_1)-st pyramid feature map to the (1_k)-th pyramid feature map are combined, the object tracking device generates RoIs for area candidates predicted to have the 1-st objects on the t-th frame by referring to the 1-st combined feature map through an RPN, generates each of pooled feature maps corresponding to each of the RoIs by performing RoI pooling operation on each of the area candidates corresponding to the RoIs on the 1-st combined feature map through a pooling layer, generates each of pieces of regression information corresponding to each of the RoIs by performing FC operation on the pooled feature maps through one or more FC (Fully-Connected) layers, and acquires the 1-st bounding boxes corresponding to the 1-st objects located on the 1-st frame by referring to the pieces of regression information corresponding to each of the RoIs.

9. An object tracking device for tracking an object in a low frame rate video, comprising:
at least one memory that stores instructions; and
at least one processor configured to execute the instructions to perform or support another device to perform processes of: (I) in response to acquiring a video image including a plurality of frames from an imaging device, (i) inputting a t-th frame corresponding to a current time among the plurality of frames into an object detection network, thereby instructing the object detection network to input the t-th frame into FPN (Feature Pyramid Network) and thus generate each of a (1_1)-st pyramid feature map to a (1_k)-th pyramid feature map corresponding to each of a 1-st scale to a k-th scale, wherein the k is an integer of two or more, and (ii) performing an object detection on a 1-st combined feature map, in which the (1_1)-st pyramid feature map to the (1_k)-th pyramid feature map are combined, and thus detect 1-st objects contained in a 1-st frame, thereby acquiring 1-st bounding boxes corresponding to the 1-st objects, and imparting unique IDs to the 1-st objects; and (II) (i) (i–1) inputting a (t+1)-th frame which is a next frame of the t-th frame into the object detection network, thereby instructing the object detection network to input the (t+1)-th frame into the FPN and thus generate each of a (2_1)-st pyramid feature map to a (2_k)-th pyramid feature map corresponding to the 1-st scale to the k-th scale and (i–2) performing an object detection on a 2-nd combined feature map, in which the (2_1)-st pyramid feature map to the (2_k)-th pyramid feature map are combined, and thus detect 2-nd objects contained in the (t+1)-th frame, thereby acquiring 2-nd bounding boxes corresponding to the 2-nd objects, (ii) (ii–1) generating a (1_1)-st cropped feature map acquired by cropping regions corresponding to the 1-st bounding boxes from a (1_1)-st specific pyramid feature map corresponding to a 1-st specific scale among the (1_1)-st pyramid feature map to the (1_k)-st pyramid feature map, (ii–2) inputting the (1_1)-st cropped feature map and a (2_1)-st specific pyramid feature map respectively into a 1-st self-attention layer and a 1-st cross attention layer, wherein the (2_1)-st specific pyramid feature map corresponds to the 1-st specific scale among the (2_1)-st pyramid feature map to the (2_k)-th pyramid feature map, thereby instructing the 1-st self-attention layer and the 1-st cross attention layer to respectively perform operations related to self-attention and operations related to cross-attention on the (1_1)-st cropped feature map and the (2_1)-st specific pyramid feature map and thus generate a (1_1)-st conversion feature map and a (2_1)-st conversion feature map, wherein the (1_1)-st conversion feature map is acquired by converting each of 1-st features of the 1-st cropped feature map to 1-st feature descriptors containing feature information and location information of each of the 1-st features and wherein the (2_1)-st conversion feature map is acquired by converting each of 2-nd features of the (2_1)-st specific pyramid feature map to 2-nd feature descriptors containing feature information and location information of each of the 2-nd features, and (ii–3) inputting the (1_1)-st conversion feature map and the (2_1)-st conversion feature map into a matching layer, thereby instructing the matching layer to acquire 1-st matching pairs by using 1-st matching probabilities acquired by matching the 1-st feature descriptors on the (1_1)-st conversion feature map and the 2-nd feature descriptors on the (2_1)-st conversion feature map, and (iii) selecting a specific 2-nd bounding box containing specific 2-nd features the most corresponding to specific 2-nd feature descriptors according to the 1-st matching pairs among the 2-nd bounding boxes, and imparting a specific unique ID identical to that of a specific 1-st object to a specific 2-nd object, wherein the specific 1-st object corresponds to a specific 1-st bounding box and the specific 2-nd object corresponds to the specific 2-nd bounding box, thereby performing object tracking.

10. The object tracking device of claim 9, wherein, at the process of (II), on condition that the 1-st matching pairs have been acquired, the processor (i) (i–1) generates (1_2)-st cropped feature map acquired by cropping regions corresponding to the 1-st bounding boxes in a (1_2)-nd specific pyramid feature map corresponding to a 2-nd specific scale among the (1_1)-st pyramid feature map to the (1_k)-th pyramid feature map, wherein the 2-nd specific scale is a greater scale than the 1-st specific scale, (i–2) selects a (2_2)-nd specific pyramid feature map corresponding to the 2-nd specific scale among the (2_1)-st pyramid feature map to the (2_k)-th pyramid feature map, (i–3) converts specific 1-st feature descriptors and the specific 2-nd feature descriptors corresponding to the 1-st matching pairs respectively to 1-st feature descriptors of the (1_2)-nd cropped feature map and 2-nd feature descriptors on the (2_2)-nd specific pyramid feature map, (i–4) inputs 1-st windows cropped to include each of the 1-st feature descriptors of the (1_2)-nd cropped feature map and 2-nd windows cropped to include each of the 2-nd feature descriptors on the (2_2)-nd specific pyramid feature map into a 2-nd self-attention layer and a 2-nd cross-attention layer, thereby instructing the 2-nd self-attention layer and the 2-nd cross attention layer to respectively perform operations related to self-attention and operations related to cross-attention on the 1-st windows and the 2-nd windows and thus generate (1_2)-nd conversion feature maps centering each of the 1-st feature descriptors on the (1_2)-nd cropped feature map and (2_2)-nd conversion feature maps centering each of the 2-nd feature descriptors on the (2_2)-nd specific pyramid feature map, and (i–5) generate specific 1-st feature descriptors on the (1_2)-nd cropped feature map corresponding to central vectors of the (1_2)-nd conversion feature maps and specific 2-nd feature descriptors on the (2_2)-nd specific pyramid feature map corresponding to specific vectors of the (2_2)-nd conversion feature maps matching with the specific 1-st feature descriptors, thereby generating 2-nd matching pairs, by using heatmaps indicating 2-nd matching probabilities generated by correlating the central vectors of the (1_2)-nd conversion feature maps with all vectors of the (2_2)-nd conversion feature maps corresponding to each of the (1_2)-nd conversion feature maps and performing softmax operation thereon, and (ii) selects a specific 2-nd bounding box containing specific 2-nd features the most corresponding to the specific 2-nd feature descriptors according to the 2-nd matching pairs among the 2-nd bounding boxes, thereby imparting the specific unique ID identical to that of the specific 1-st object corresponding to the specific 1-st bounding box to the specific 2-nd object corresponding to the specific 2-nd bounding box and thus performing the object tracking.

11. The object tracking device of claim 10, wherein, prior to the process of (I), the processor (i) performs the object detection and the object tracking for t-th frame for training and (t+1)-th frame for training, thereby acquiring 1-st matching pairs for training and 2-nd matching pairs for training, (ii) trains at least part of weights of the 1-st self-attention layer, weights of the 1-st cross-attention layer and weights of the matching layer as learning processes for the 1-st matching pairs for training by using negative log-likelihood loss for 1-st matching probabilities for training, and (iii) trains at least part of weights of the 2-nd self-attention layer and weights of the 2-nd cross-attention layer as learning processes for the 2-nd matching pairs for training by using ground truth descriptors corresponding to feature descriptors for training of specific vectors for training of (2_2)-nd conversion feature map for training and total variance of heatmap for training with respect to 2-nd matching probabilities for training.

12. The object tracking device of claim 9, wherein, at the process of (II), the processor (i) adds (1) leveled feature maps acquired by converting each of the (1_1)-st cropped feature map and the (2_1)-st specific pyramid feature map into each one-dimension vector, and (2) a position conversion map acquired by changing (x, y) coordinates which are positional information of features of the (1_1)-st cropped feature map and the (2_1)-st specific pyramid feature map into Random Fourier Features each of which is each sum of a cosine function and a sine function, and performs operations related to self-attention on a summation of said (1) and said (2), to thereby generate a 1-st self-attention result and a 2-nd self-attention result respectively corresponding to the (1_1)-st cropped feature map and the (2_1)-st specific pyramid feature map, and (ii) generates the (1_1)-st conversion feature map and the (2_1)-st conversion feature map by performing operations related to cross-attention on the 1-st self-attention result and the 2-nd self-attention result.

13. The object tracking device of claim 9, wherein, at the process of (II), the processor (i) crops the areas corresponding to the 1-st bounding boxes on the (1_1)-st specific pyramid feature map corresponding to a 1-st specific scale among the (1_1)-st pyramid feature map to the (1_k)-st pyramid feature map, wherein the areas are cropped by using resized 1-st bounding boxes with (1_1)-st widths and (1_1)-st heights and wherein the (1_1)-st widths and the (1_1)-st heights are acquired by multiplying (1) a ratio of the (1_1)-st specific pyramid feature map corresponding to the 1-st specific scale and the t-th frame (2) to 1-st widths and 1-st heights of the 1-st bounding boxes, such that the 1-st bounding boxes correspond to the 1-st specific scale, and (ii) generate the (1_1)-st cropped feature map by resizing the (1_1)-st widths and the (1_1)-st heights such that the (1_1)-st cropped feature map is larger than the 1-st bounding boxes and has a ratio of width to height that is same as the 1-st bounding boxes.

14. The object tracking device of claim 13, wherein, in a process of generating the (1_1)-st cropped feature map by cropping and resizing the areas corresponding to the resized 1-st bounding boxes, the processor determines each of location coordinates on the (1_1)-st specific pyramid feature map corresponding to each of pixels on the (1_1)-st cropped feature map, and generates each of weighted sums for feature values of four integer pixels surrounding each of the location coordinates on the (1_1)-st specific pyramid feature map as each of feature values for each pixel on the (1_1)-st cropped feature map.

15. The object tracking device of claim 9, wherein, at the process of (II), the processor (i) generates the (1_1)-st conversion feature map and a (2_1)-st conversion feature map, wherein the (1_1)-st conversion feature map is acquired by converting each of the 1-st features of the 1-st cropped feature map to the 1-st feature descriptors containing the feature information and the location information of each of the 1-st features through performing operations related to self-attention and cross-attention on each of the (1_1)-st cropped feature map and the (2_1)-st specific pyramid feature map, wherein the (2_1)-st conversion feature map is acquired by converting each of the 2-nd features of the (2_1)-st specific pyramid feature map into the 2-nd feature descriptors containing the feature information and the location information of each of the 2-nd features, (ii) calculates each of the 1-st matching probabilities of each of descriptor pairs by matching each of the 1-st feature descriptors on the (1_1)-st conversion feature map and each of the 2-nd feature descriptors on the (2_1)-st conversion feature map, and (iii) acquires each of the 1-st matching pairs by using location information on specific 1-st feature descriptors and location information on specific 2-nd feature descriptors excluding outliers among specific descriptor pairs having the 1-st matching probabilities greater than the preset threshold.

16. The object tracking device of claim 9, wherein, at the process of (I), in a process of performing the object detection on the 1-st combined feature map in which the (1_1)-st pyramid feature map to the (1_k)-th pyramid feature map are combined, the processor generates RoIs for area candidates predicted to have the 1-st objects on the t-th frame by referring to the 1-st combined feature map through an RPN, generates each of pooled feature maps corresponding to each of the RoIs by performing RoI pooling operation on each of the area candidates corresponding to the RoIs on the 1-st combined feature map through a pooling layer, generates each of pieces of regression information corresponding to each of the RoIs by performing FC operation on the pooled feature maps through one or more FC (Fully-Connected) layers, and acquires the 1-st bounding boxes corresponding to the 1-st objects located on the 1-st frame by referring to the pieces of regression information corresponding to each of the RoIs.

\* \* \* \* \*